(12) United States Patent
Phillips et al.

(10) Patent No.: US 7,767,095 B2
(45) Date of Patent: *Aug. 3, 2010

(54) PATHOGEN REDUCTION USING CHLORAMINES

(75) Inventors: Joe D. Phillips, Poquoson, VA (US);
Robert P. Kim, Wexford, PA (US);
Stephen P. Axtell, Mint Hill, NC (US);
Sam M. Jaffe, Cookeville, TN (US)

(73) Assignee: Zentox Corporation, Wellesley Hills, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/115,152

(22) Filed: May 5, 2008

(65) Prior Publication Data

US 2008/0226782 A1    Sep. 18, 2008

Related U.S. Application Data

(63) Continuation of application No. 10/521,310, filed as application No. PCT/US03/21577 on Jul. 11, 2003, now Pat. No. 7,387,736.

(60) Provisional application No. 60/396,177, filed on Jul. 16, 2002, provisional application No. 60/463,261, filed on Apr. 16, 2003.

(51) Int. Cl.
*C02F 1/76* (2006.01)
*C02F 103/32* (2006.01)

(52) U.S. Cl. .................. 210/752; 210/754; 210/760; 210/764; 210/765; 422/37; 426/332; 426/335

(58) Field of Classification Search .............. 210/754
See application file for complete search history.

(56) References Cited

U.S. PATENT DOCUMENTS

| | | | | |
|---|---|---|---|---|
| 5,879,732 | A | * | 3/1999 | Caracciolo et al. ........ 426/231 |
| 5,902,619 | A | * | 5/1999 | Rubow et al. ............. 426/235 |
| 6,120,812 | A | * | 9/2000 | Harvey et al. ............. 426/66 |
| 6,245,210 | B1 | | 6/2001 | Nakamura |
| 6,398,965 | B1 | * | 6/2002 | Arba et al. ............... 210/652 |
| 6,605,253 | B1 | | 8/2003 | Perkins |
| 7,077,967 | B2 | * | 7/2006 | Perkins et al. ............ 210/760 |
| 7,387,736 | B2 | * | 6/2008 | Phillips et al. ............ 210/752 |
| 7,473,370 | B2 | * | 1/2009 | Kouame ................... 210/668 |

FOREIGN PATENT DOCUMENTS

GB    608543    9/1948

OTHER PUBLICATIONS

Scott M. Russell and Stephen P. Axtell, Monochloramine Versus Sodium Hypochlorite as Antimicrobial Agents for Reducing Populations of Bacteria on Broiler Chicken Carcasses, Journal of Food Protection, 2005, 758-763, vol. 68 No. 4, U.S.

Stephen P. Axtell, Scott M. Russell, and Elliot Berman, Effect of Immersion Chilling of Broiler Chicken Carcasses in Monochloramine on Lipid Oxidation and Halogenated Residual Compound Formation, Journal of Food Protection, 2006, 907-911, vol. 69 No. 4, U.S.

* cited by examiner

*Primary Examiner*—Peter A Hruskoci
(74) *Attorney, Agent, or Firm*—Seyfarth Shaw LLP; John C. Serio

(57) ABSTRACT

A method and apparatus for implementing pathogen reduction within a poultry processing or food processing plant that uses water that has been treated with chloramines at an advantageous dosage before being introduced to the production process at processing steps. The water treated with chloramines may be from a fresh water source or reclaimed water from the processing plant. The reintroduction of the treated reclaimed water advantageously causes a dramatic reduction in the levels of microorganisms associated with poultry processing, while substantially conserving water use.

37 Claims, 7 Drawing Sheets

PATHOGEN REDUCTION USING CHLORAMINES

CROSS REFERENCES TO RELATED APPLICATIONS

Figure 1:
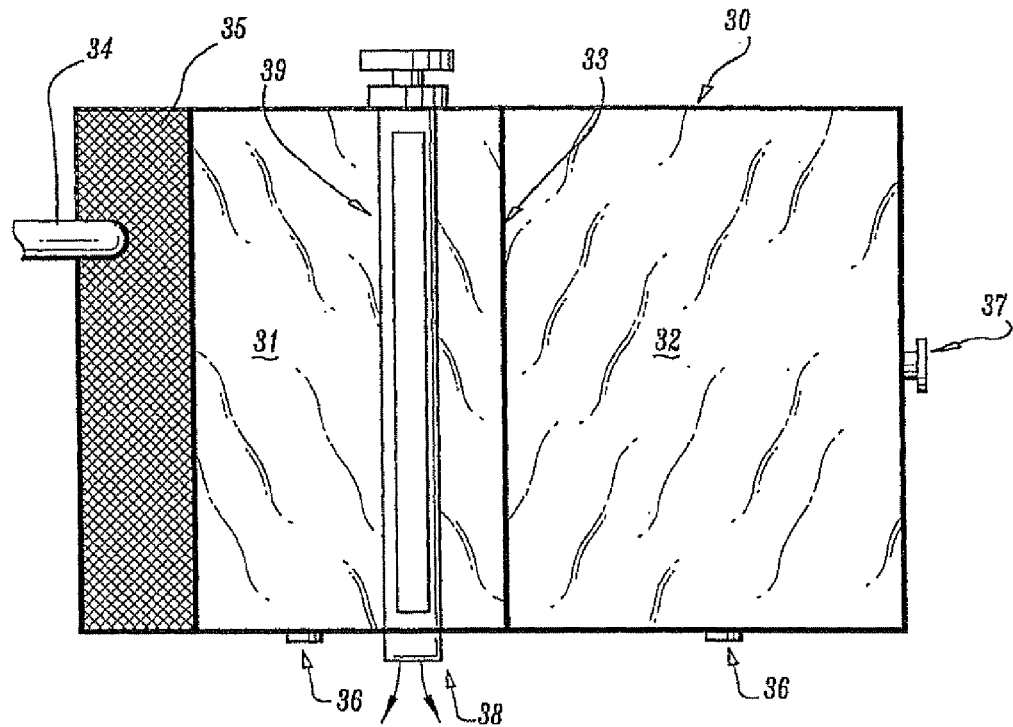

This application is a continuation of U.S. patent application Ser. No. 10/521,310, filed Jan. 13, 2005, now U.S. Pat. No. 7,387,736, which is a 371 of PCT/US03/21577, filed Jul. 11, 2003. This application is entitled to the benefit of and claim priority from U.S. Provisional patent application Ser. No. 60/396,177, filed Jul. 16, 2002, and U.S. Provisional Patent Application No. 60/463,261, filed Apr. 16, 2003, which are both hereby incorporated by reference.

BACKGROUND OF INVENTION

1. Technical Field

The present disclosure relates generally to the field of pathogen reduction in food processing media, and more particularly to the use of inorganic chloramines as antimicrobial agents in food processing waters used upon food products.

2. Background of the Related Art

Potable water treatment facilities have two primary objectives in controlling pathogens in the public drinking water supply. The first is to eliminate pathogens as part of the water treatment process within the treatment plant and the second is to provide a residual disinfectant in the finished water to prevent microbial regeneration in the distribution system that carries the water to the consumer.

Because of its efficacy in inactivating a wide range of microbes, chlorination became the standard method for disinfecting potable water in both the water treatment plant and in the distribution system.

However, the reaction of chlorine with naturally occurring organic matter (NOM) in the water can result in the formation of suspected carcinogens such as chloroform, which is in the group of potentially dangerous disinfection byproducts called trihalomethanes. Growing public health concerns gave rise to the Safe Drinking Water Act Amendments of 1996, which required the U.S. Environmental Protection Agency (EPA) to develop new drinking water regulations, including rules to address simultaneous compliance of microbial disinfection and disinfection by product generation.

The Disinfection and Disinfection By-products Rules established microbial reduction standards, maximum residual levels for disinfectants and limits for disinfection byproducts such as trihalomethanes (THMs) and haloacetic acids (HAA5). Since these byproducts are formed by chlorinating certain organic compounds that are typically present in source waters, many drinking water plants were forced to change their methods of disinfection to reduce the formation of these byproducts.

Because of its chemical characteristics, monochloramine, a slow-reacting and persistent anti-microbial agent that is not prone to react with organic matter, gained widespread use in programs designed to meet the new rules. This chlorine species is generated by the controlled mixing of chlorine and ammonia in water. Currently monochloramine is used primarily to provide a residual biocide in potable water distribution systems. Because of its relatively low antimicrobial efficacy, monochloramine is not generally used as a primary disinfectant in potable water treatment. The increased usage of monochloramine treatment by municipal water treatment facilities is not because of its disinfection qualities, but rather the change is taking place as part of a strategy to avoid production of THMs in drinking water.

In his 1967 work, "Aspects of the Quantitative Assessment of Germicidal Efficiency," J. C. Morris presented a tabulation of the concentrations of various germicides required to inactivate 99 percent of the targeted microbes in ten minutes of contact time. Today this is called specific lethality and is commonly used to compare the biocidal efficacies of chemical oxidizers. At 5.degree. C., the specific lethality of hypochlorous acid (the active agent in typical chlorination process) was-determined to be at least 200 times that of monochloramine in inactivating enteric bacteria and viruses. Even the hypochlorite ion (the less biocidal component of free chlorine) was determined to have a specific lethality twice that of monochloramine in inactivating enteric bacteria and four times that of monochloramine in inactivating viruses.

Because of their low specific lethalities, chloramines have been generally disregarded in the search for highly efficacious biocides in the food processing industry. Instead, traditional disinfectants (e.g., chlorine) that have been used and proven in potable water treatment have generally been adopted for use within food processing.

When an aqueous medium is used as the vehicle to deliver an antimicrobial agent to a food product during processing, the environment in which the antimicrobial agent must perform is significantly different from that of potable water. In typical potable water the total organic load is a small fraction of what is found in organically laden process water in a food processing plant. Although the effect of the environment (i.e., organic load in the water) on the efficacy of an antimicrobial agent may have been recognized, there seems to have been an underlying assumption by those skilled in the art that the relative efficacies of the various disinfectants would remain the same in process water with a high organic load as compared to potable water. This may partially explain the absence of research and general information on the use of what are traditionally considered "weak disinfectants", such as chloramines, in applications that require antimicrobial action in food process waters, on food products, and in ice that will contact food products.

One example of food process waters that undergo substantial changes during processing that have a marked effect on the efficacy of added antimicrobial agents can be found in a poultry processing plant. Process water in a poultry processing plant can have extremely high levels of total organic carbon (TOC) and a correspondingly high chemical oxygen demand (COD). Undesirably, any free chlorine added to these high-demand waters rapidly reacts with the organic constituents and is consumed in seconds, becoming unavailable for disinfection. Monochloramine, which is less reactive and more persistent, remains available to inactivate the microbial population and therefore, under these conditions can be a more effective disinfectant than free chlorine. It has been found that monochloramine treated process waters produce a nominal one log (10 fold) reduction in pathogen levels over those treated with equivalent concentrations of sodium hypochlorite (free chlorine). In organically laden water, chloramine disinfection is a more effective disinfecting agent than free chlorine.

A typical poultry processing plant receives live animals from the grow-out farms, slaughters the animals, drains the blood and then removes the feathers, "paws," heads and detritus in the initial stages of processing. The carcasses are then sent to mechanized evisceration where the internal organs, digestive tract and other edible and inedible parts are removed. In typical operations, some of the internal organs (i.e., heart, liver and gizzards) are harvested for food products. The carcasses are thereafter sent by way of mechanized line operations through a series of washing and sanitizing steps before the product is shipped as "fresh" product, packaged for freezing or further processed. These line operations typically consume large quantities of water, the characteristics of which change substantially during the process as organic matter enters the water.

Accordingly, the poultry processing industry has generally been characterized as a large volume consumer of water in conducting the slaughter, processing and packing of animals for both human consumption and other uses. Recent initiatives by the United States Department of Agriculture (USDA), under the jurisdiction of the Food Safety Inspection Service (FSIS), have resulted in a further increase in the volume of water used to wash poultry carcasses to meet the more stringent requirements of "zero tolerance" for visual fecal contamination.

In addition, poultry industry interests have been actively seeking methods of reducing the consumption of water due to economic reasons and, additionally in some cases, because of limited availability of sufficient volumes of water to meet the processing requirements. Still other considerations involving limited water treatment resources have raised the need to reduce water consumption. One illustrative embodiment of the present invention provides additional solutions to reuse process water and therefore to reducing the volume of water required for processing poultry or other foodstuffs.

Prior food processes have not focused on the need to conserve water from an economic perspective and accordingly, while they may generally involve water reuse applications, their approaches have failed to address critical economic restrictions inherent in poultry and other food processing operations. It is yet another object of the present invention to provide water reuse processes which are economically feasible and which provide improved savings to the food processing manufacturer.

Typical of prior approaches have been efforts directed to the recovery, treatment and recycling of poultry chiller bath water in a closed loop and "semi-closed loop" type of process where water from the chiller baths is treated to remove solids, fats, oil, grease, organic compounds and microorganisms before reintroducing the treated water to the chiller baths. These efforts may be characterized as primarily aimed at reducing the electrical power requirements and thereby costs associated with chilling the water used in these systems of processing operations. These goals are generally met by reusing the already cooled chiller water and trying to reintroduce the already chilled water back into the chiller makeup feed water, thereby reducing the temperature of incoming fresh water. Unfortunately, the recovery of used chiller bath process water brings with it a very high contamination burden requiring extensive treatment. Representative examples of such approaches have been described in U.S. Pat. Nos. 5,728,305; 5,173,190; 5,178,755; 5,053,140; 4,790,943; and 5,593,598. Unfortunately, such approaches have had some limited success in addressing the treatment challenges, they have to date proven to be of questionable economic value to the industry. It is still another object of the present invention to address such deficiencies within the prior art with the use of monochloramine chemistry as well as other approaches and devices, which are economically sensitive.

Prior efforts have also generated a substantial number of devices designed to provide some filtering efforts. U.S. Pat. Nos. 5,759,415; 5,248,439; 5,132,010; 4,876,004; 4,844,189; 4,481,080 and 3,912,533 provide representative examples of such devices. As will be readily noted, some are structurally complex requiring substantial capital expenses and others, while simpler in structure, are aimed at solving different needs.

For example, U.S. Pat. No. 4,481,080 shows a series of printouts separated by baffles for equalizing the residence times of large and small particles. It has been discovered that such solutions are either unnecessarily complex or are unnecessary altogether. It is another aspect of the present invention to provide antimicrobial chemistry as well as devices useful in water recovery and treatment methods, which avoid such deficiencies and solve the needs presented by gross levels of contaminants and other organic matter in process waters.

In several of the above referenced patents their efforts have been directed at chilled water reuse claiming significant savings in BTU requirements. The devices employed have focused upon the recovery, treatment and reuse of the USDA required 0.5 gallon per bird overflow. While the technical approaches may differ from invention to invention, they share the common disadvantages that the source of their water (i.e., bird chiller water) contains a significant and high quantity of organic contaminants as compared to the sources that are identified by the invention herein, and the volumes available for recovery are limited strictly to the USDA mandated 0.5 gallon per bird limitation. It is yet another object of the present invention to avoid the disadvantages associated with such prior art approaches.

The chiller in a poultry slaughter process is used to lower the carcass temperature of slaughtered birds and to introduce antimicrobial agents for the purpose of reducing pathogens both in the chiller water and on the poultry carcasses. The industry standard antimicrobial treatment of poultry chiller water is free chlorine usually delivered in the form of sodium hypochlorite (chlorine bleach). Unfortunately, the use of free chlorine in prior art methods does not reduce pathogens to the desired levels and creates environmental and workplace hazards including hazardous off-gassing within the plant.

The poultry chiller is a large communal bath where fresh carcasses are constantly being added while chilled carcasses are removed. Depending upon the particular plant, carcasses may remain in the chiller for 1-6 hours. There can be hundreds of carcasses in the chiller at any point in time. Unfortunately, the potential for cross contamination of carcasses in this communal bath is very high. In an attempt to control the concentration (load) of organic material in the chiller, fresh makeup water is added which causes the chiller to overflow in an effort to eliminate contaminants. However, the organic loading of water in a typical chiller remains very high in spite of the added water. For example, the chemical oxygen demand (COD) of water in a typical chiller will often range from 1,000-2,000 parts per million. The challenge of treating this organic load within the water is very difficult and unmet with prior art disinfectants.

USDA FSIS allows the addition of chlorine at levels up to 50 ppm in chiller make-up water. A chlorine demand of 1,000-2,000 ppm cannot be overcome by 50 ppm of free chlorine in the make-up water. Experiments by USDA Western Region ARS concluded that free chlorine residual could not be established in a chiller even by adding up to 400 ppm of free chlorine.

The most commonly used prior art disinfectants in a food processing plant are highly reactive oxidizing agents. One way of predicting the efficacy of certain disinfectants is by the rapidity with which they can oxidize other substances. Greater oxidation speeds often cause higher microbial kills. Ozone and chlorine can oxidize very quickly and are widely used as disinfectants. Unfortunately, the very characteristic that normally makes highly reactive oxidants effective disinfectants in drinking water minimizes their effectiveness in the environment of a poultry chiller or other process water environment having high organic load. The demand for chlorine in chiller water is measured in thousands of parts per million. Being highly reactive, free chlorine will rapidly oxidize, bleach or combine with any component of the chlorine demand. When chlorine combines with another substance, it ceases to be highly oxidative and loses its ability to bleach.

Because of the virtually inexhaustible demand caused by the organic load within a chiller, when free chlorine is added to the chiller, it remains free and therefore active, for only seconds. Even with relatively high doses of free chlorine, the contact time with chiller microorganisms is so short, that the Concentration-Time (CT) Value always remains low.

Because of the problems with using free chlorine within the food processing environment, a substantial number of compounds have been explored for use as disinfectant in place of chlorine. For example, U.S. Pat. Nos. 5,437,868, 5,314,687 and 5,200,189 to Oakes et al. are directed to peroxyacetic acid type compounds used as antimicrobials. Another attempt to improve disinfectants within the food industry is set forth in U.S. Pat. Nos. 6,545,047 and 6,103,286 to Gutzmann et al. "Treatment of Animal Carcasses" which also relates to peroxyacetic acid. Unfortunately these compounds are most effective at low pH, which can be destructive to food processing equipment. There can also be worker safety issues involved in the handling of such compounds.

Other efforts towards alternative disinfectants have been directed to the use of acidified sodium chlorite as disclosed in U.S. Pat. No. 6,063,425, Kross et al, "Method for Optimizing the Efficacy of Chlorous Acid Disinfecting Sprays for Poultry and other Meats". Unfortunately, the disinfectant that is produced by combining the raw materials (sodium chlorite and acetic acid) is generated at a very low pH (about 2.5) which can be destructive to food processing equipment. Off-gassing, which can be detrimental to worker health, can also result from the mixing of chlorine and acidified sodium chlorite within the processing plant.

A further disinfectant by Rhodia is directed at using trisodium phosphate (TSP) as disclosed in U.S. Pat. No. 5,882,253, Mostoller, "Apparatus and Method for Cleaning Poultry". Unfortunately, there are negative environmental impacts from the addition of trisodium phosphate to a plant's wastewater since phosphate is a regulated wastewater pollutant. There have also been reports of negative impacts to the quality of poultry treated with this compound.

Despite these various chemistries, they are unfortunately used only for on-line reprocessing and in a few selected cases also in the chiller. They suffer from the disadvantage of only being able to be used at one or possibly two specific points in the processing line and not throughout the plant. Unfortunately, none of these above disinfectants have been able to replace chlorine throughout the food processing plant.

While biocides that are not highly oxidative may not have the same disinfectant qualities of those that are highly oxidative in pure water, their use within certain environments offers the potential to be far more effective because such biocides are not as readily consumed by the resident chlorine demand. The less chemically reactive biocide thereby remains active and available to reduce the microbiological populations in the chiller or in other process waters having high organic load. Our discovery is that a relatively small dose of a less potent but more persistent biocide resulting in a residual presence throughout the chiller or other organically laden process water will out perform its highly oxidative counterpart in reducing the overall microbial load.

Another area having high organic loading process water within a poultry processing operation is the poultry scalder tank. The scalder tank is one of the very initial steps in the slaughter process and one of the points in which the water is heavily loaded with organic materials. Water in the scalder has an extremely high organic load, high microbial population and high temperature. The scalder is a communal tank holding numerous carcasses at any point in time, which like the chiller provides great potential for cross contamination. The conditions in the scalder (i.e., high organic load and high temperature) cause the rapid consumption of free chlorine, which significantly degrades the disinfection potential of the chlorine.

Research has indicated that aeration and boiling of water, characteristics of normal scalder operations, will not destroy monochloramine. This characteristic of monchloramine allows a pathogen reduction step at scalders that is not appreciably affected by temperature or aeration. It has also been found that monochloramine is more effective than free chlorine for inactivation of biofilm bacteria, as the greater penetrating power of monochloramine more than compensates for its reduced disinfection activity.

Yet another area of high water use within poultry processing and therefore the need for effective disinfection of water is the evisceration line and various wash cabinets on the processing line. These points of treatment within the evisceration line are between the scalder at one end and the chiller at the other end of a typical poultry processing plant. USDA regulations allow poultry processors to recondition used process water to specific treatment standards for reuse. While this reuse water is typically treated to be pathogen free and often has a turbidity level comparable to potable water, the reuse water does have higher levels of soluble organic loading than found in fresh water. Because of this organic loading, any applied free chlorine will be rapidly consumed, precluding the establishment of an active residual disinfectant. Unfortunately, the lack of an active residual disinfectant will enable bacterial regeneration in water storage and distribution systems.

Advantageously, a chloramine residual can be established in recycled water that is rich with organics. This residual can then be used both to reduce the potential for bacterial regeneration and to subsequently help disinfect whatever the recycled water contacts. The inventive method therefore broadens the potential applicability of water reuse systems within poultry processing plants. With chloramine treatment, the quality of disinfected recycled water can be effectively maintained and the water itself can be used as a vehicle to deliver an effective anti-microbial agent. The inventive method therefore enhances the economic viability and effectiveness or water reuse systems within poultry processing and other food processing systems.

The stable active residual provided by monochloramine and its enhanced ability to penetrate bacterial cell walls provides consistent pathogen reduction on equipment used in a poultry processing plant.

It is contemplated within the scope of this invention that chloramination can be universally applicable to the treatment of food processing waters and the manufacture of ice independent from or in conjunction with any or all steps described herein regarding the treatment of process waters for reuse.

SUMMARY

In one particular illustrative embodiment in accordance with the principles of the present disclosure, the inventive approach of the present invention includes processes which allow for the safe and economic recovery, treatment and reuse of certain poultry processing water, specifically including the "carcass final rinse," "inside/outside carcass rinse," "water rails", water sprays used in the inspection process, scalders, instruments, flume transport of various animal parts, water from the communal chiller bath and other smaller streams with respect to poultry processing operations and other food processing applications, like red meat washing, fruit and vegetable washing, retort cookers and pasteurizers.

The present disclosure contemplates implementing a water reuse program that returns disinfected reuse water to which chloramines have been added at an advantageous dosage before being reintroduced to the production process at an upstream point, such as in the scalder or similar heating portion of the processing steps. The reintroduction of the chloraminated reuse water into the scalder or similar heating processing step advantageously causes a dramatic reduction in the levels of microorganisms associated with the carcasses that have not been found in the prior art.

The inventive method further contemplates introducing chloramine treated water, for example, along the foodstuffs processing steps, such as along the points where the use of heated water is applicable, such as in the scalder or similar processing steps which subject the carcasses or food product to heated water. In such heated processing steps, the pores and tissue membranes of the carcasses are open and are more readily receiving of the surrounding water, i.e., the chloraminated water, thereby having greater efficacy to the removal of microorganisms associated with such foodstuff processing.

It is contemplated within the scope of the invention that in certain circumstances chiller bath overflow water may be used as one of the water sources for reuse if such chiller water can be sufficiently diluted with water from other sources. According to the invention, the intended points of re-use for this recovered and treated water have been identified to include chiller bath water, evisceration wash water, defeathering water and other "non-product contact" processes. Additionally, in those plants where transport of process water is complicated due to plant layout and physical design an improved device is provided for effecting an economic and efficient recovery system comprising a recovery sump with a continuing overflow to permit reconditioning through the removal of soiled water, grease and oils.

In an alternate illustrative embodiment, the present disclosure employs an approach which focuses on appropriately regulating and controlling the pH of process water to be disinfected through addition, regulation and control of a disinfecting agent. The control of pH and level of disinfecting agent is implemented throughout multiple steps in the production process including any process water to be recovered and reused. This is in contrast to prior approaches which have failed to appreciate the benefits associated with pH control, multiple point controlled treatment, or even the unexpected advantages to be gained by reducing the organic loads within such process water.

The poultry process treatment water which can especially benefit includes water used in poultry scalding, picking, post-pick washing, evisceration, carcass washing and other stages of poultry processing designed to physically remove any fecal matter, ingesta and other digestive tract remnants from the slaughter and evisceration processes. Additionally, an improved device and method are provided for effecting economic and efficient regulation of chloramines disinfection agent and control of chloramines disinfection chemistry throughout the multiple steps of the production process.

Physical removal of visible fecal material and other contaminants from poultry carcasses will be carried out by serial carcass washing steps (e.g., scalder, picker, post pick spray wash, inside/outside carcass washing cabinets and outside carcass washing cabinets) where medium pressure, high volume water spraying is employed. The controlled introduction of chloramines according to the invention can be applied at multiple treatment stages (e.g., scalder, picker, post pick spray wash, inside/outside carcass wash and outside carcass wash) and using the best practical control methods is designed to significantly reduce microbial levels on all carcasses prior to and after their entry into the immersion chiller system.

Aspects of the invention include the benefits of adding chloramines to poultry chiller water together with the effectiveness of increased concentration time (CT) through the implementation of multiple stage treatment of the carcass during slaughter, evisceration, washing and chilling.

According to the invention, combining a chlorine source with a known amount of ammonia produces chloramines. The use of monochloramine, as opposed to the other constituents of total combined chlorine, reduces the risk of chlorine off gassing from the chiller or other points within the plant and thereby preventing worker safety hazards and producing a reduction in pathogens to a desired level.

Additionally, the present disclosure provides for effecting economic and efficient regulation of disinfection agent effectiveness comprising a system and method for removing a major portion of filterable materials including fats, oils and greases (FOG), total suspended solids (TSS), proteins, blood products, lipids and other materials represented as total chemical oxygen demand (COD) from the chiller tank water.

Aspects of the presently disclosed disinfection process for use in the processing of foodstuffs are designed as an intervention step in poultry processing to allow for continuous on-line reprocessing of poultry carcasses that may have accidentally become contaminated during the evisceration process. Such on-line reprocessing is designed to replace the need for off-line manual washing and cleaning of the contaminated carcasses. By eliminating such off-line manual washing, food safety will be enhanced due to the elimination of the physical handling of carcasses and the cross-contamination that may result from such physical handling. An additional benefit is that it will be possible to run the production process with a reduced number of interruptions, which will result in a more efficient production process that will produce increased yields.

The disinfection process according to the present invention can include: the removal, using the processing plant's existing washing, spraying and mechanical scrubbing devices (modified if required), of visible fecal material or other contaminants from the carcasses resulting from the mechanical evisceration process; the controlled introduction of chloramines at multiple stages to improve food safety by reduction of total microbial levels; the improvement of disinfection in the facility's overall production process including the carcass chiller system through the use of chloramine disinfectant techniques to further reduce microbial counts, and the reduction of the amount of physical handling of carcasses and therefore, reduction of the potential for cross-contamination through the implementation of continuous on-line processing of poultry carcasses that may accidentally become contaminated during the evisceration process.

Further, the present invention is specifically designed to be easily incorporated into the processor's existing production equipment and plant layout. This ease of implementation is accomplished by using, to the greatest extent possible, the processor's existing carcass wash stations, scalders, pickers and other designated treatment points as the point of treatment by using the existing water piping and delivery systems as the means of delivery of the invention's chemical and disinfection enhancements.

While the introduction of chloramines may be accomplished using standard spray equipment in the processor's existing carcass washing stations alternative spraying mechanisms and/or treatment stations may be used to address specific needs. In an alternative embodiment of the present invention, the chloramine solution spray can comprise a fogged material utilizing available fogging apparatus that leaves a dispersion of fog particles in a continuous atmosphere to envelope the carcass.

In another alternative embodiment of the present invention, the carcasses may be treated with an electrostatically charged spray of the chloramine solution. In this embodiment, the chloramine solution can be applied as charged droplets by using conventional electrostatic spray technologies. Surfaces such as walls, conveyor belts and equipment carry a natural positive charge, as do animals such as chicken carcasses. When high-pressure air and a chloramine solution are forced through a small aperture in the electrostatic spray nozzle, the air shears the sanitizer into tiny droplets. These droplets are then exposed to an electrical charge as they exit the nozzle head. This transfers a negative charge to the drops of chloramine solution, which then have a particular affinity for the surfaces in the area, such as equipment, chicken carcasses or other foodstuffs. The charged droplets provide an evenly distributed solution layer on the treated surface. Because the deposition of sanitizer on the surface being treated is so much more efficient, significantly less sanitizer is required to achieve the same bacterial disinfection rate when compared to common commercial sprayers. Many sanitizers, especially those that are highly oxidative, cannot be used with electrostatic sprayers, since the electrical charge can completely eliminate their killing power before they reach the targeted surface.

In yet another alternative embodiment of the present invention, surfaces may be treated with a chloramine solution in a foam formulation that would adhere to surfaces for a longer period of time than the liquid alone. This would increase the contact time on the treated surface thereby increasing the CT (Concentration-Time) value and overall efficacy of the antimicrobial treatment.

The invention described herein is designed to meet the current USDA regulations for removal of visible fecal material using the plant's existing washing, spraying and mechanical scrubbing devices, and to reduce microorganism counts and improve food safety, all in a more cost effective, safer and environmentally friendly manner than other approaches.

BRIEF DESCRIPTION OF THE DRAWINGS

The foregoing and other features and advantages of the present invention will be more fully understood from the following detailed description of illustrative embodiments, taken in conjunction with the accompanying drawing in which:

FIG. 1 is a top plan view illustrating one particular embodiment of a recovery sump device, in accordance with the present disclosure;

FIG. 2 is a side cross-sectional view illustrating the recovery sump device shown in FIG. 1, in accordance with the present disclosure;

FIG. 3 illustrates an overall flow chart of one particular embodiment of a water recovery system, in accordance with the present disclosure;

FIG. 4 illustrates an alternate embodiment of a detailed operative engaging flow plan;

FIG. 5 illustrates a flow chart of another embodiment of the water recovery system according to the present disclosure;

FIG. 6 is a graphical representation of the average reduction in *salmonella* on chicken carcasses due to chiller treatment using the invention method;

FIG. 7 is a graphical representation of the average reduction in *e. coli* on chicken carcasses due to chiller treatment using the inventive method;

FIG. 8 is a graphical representation of the average reduction in *pseudomonas flourescens* on chicken carcasses due to chiller treatment using the inventive method;

FIG. 9 is a schematic illustrating a methodology to manufacture and inject chloramines.

DETAILED DESCRIPTION OF THE INVENTION

The illustrative embodiments of the apparatus and methods disclosed herein are discussed in terms of poultry processing water disinfection processes and in particular chicken processing plants. It is contemplated within the scope of the invention, however, that the disclosure is applicable to a wide variety of food processes including, but not limited to general carcass processing in the poultry industry along with carcass, parts and trim processing in the beef and pork and seafood industries along with bulk food processing within the produce industry. It is contemplated within the scope of the invention that the inventive method may be used within any food processing system where it is desirable to reduce pathogen via aqueous medium used within the processing methods.

The inventive method, of using chloramines for pathogen reduction is also applicable to water reclamation and reuse applications in which organic loads are higher than that normally encountered in potable water and which require a persistent antimicrobial residual in the finished water.

The inventive method is also envisioned to be applicable to extending the shelf life of food products by treatment with chloraminated process waters and/or a dedicated final chloramine spray or dip prior to packaging. The persistence of the chloramine will continue to provide antimicrobial action after packaging, increasing the safety of the product to the consumer as well as extending the useful life of the product.

It is further envisioned that the treatment and chloramination processes described in the present disclosure are applicable to the making ice intended to both cool food products and to provide an antimicrobial agent to water and food products in direct contact. The following discussion includes an explanation of relevant terminology, a description of instrumentation employed for poultry processing and water disinfection, in accordance with the present disclosure, followed by a description of the preferred processes associated therewith.

A poultry processing line includes multiple processing steps. One step involves a poultry carcass being immersed in a chiller tank and is referred to as the "chilling step." During the chilling step, temperature of the poultry carcass is cooled as a result of immersion in a cold water bath. The "chilling step" is significantly different from other processing steps such as scalding, picking, evisceration, and various washing steps. These steps are referred to as "non-chilling processing steps."

Water in the chiller tank is significantly different from water in the various non-chilling steps in terms of organic loading and temperature. The poultry carcass is placed in the chiller tank in an effort to cool the carcass to a temperature which inhibits the growth of pathogens. Carcasses entering the chiller tank may be as warm as 1000.degree. F. and exit at approximately 34-38.degree. F.

The chiller tank is a communal tank that can hold hundreds of poultry carcasses for 1-6 hours, or longer. A required volume of makeup water, based on the number of carcasses processed, is added to the chiller tank resulting in overflow from the chiller tank. The water in the chiller tank has an extremely high organic load of both suspended and dissolved organic materials from the poultry carcasses. The organic material is removed to prescribed levels according to regulations, discussed below, for water reuse.

In comparison, the non-chilling processing steps perform quick sprays or dunks of carcasses in water having a temperature of approximately 60-80.degree. F. It is contemplated that carcasses sprayed by wash cabinets for 15 seconds or less, up to an exposure time of approximately 2-3 minutes will benefit from chloramine addition. Other than water from the scalder, the water from non-chilling processing steps has significantly less organic load and is less costly to treat to meet appropriate USDA regulations for reuse.

Further, the non-chilling processing steps are not designed to cool the carcass. It is contemplated that in a typical large scale processing plant, the total time from killing of a chicken to entering the chiller tank is approximately 5 minutes which includes all non-chilling processing steps.

The present invention will benefit from the application of one or more devices which focus on the source(s) of the process water to be recovered and reused. There are several preferred methods employed in this invention to recover the desired source streams. It is contemplated within the scope of the invention that the inventive method of using chloramines can be applied to both recovered and non-recovered water within a food processing plant.

Plant logistical layout and trench drain system locations as well as elevations determine the appropriate devices used for the capture and recovery of the source streams. In those plants where adequate trench drains at the appropriate elevations are not available the present invention will benefit from the use of a recovery sump system.

The recovery system contributes to the process' efficiency and economics and it takes advantage of the physical characteristics of the waste stream to be recovered. Specifically, where possible, the recovery sump is designed to allow for a continuous overflow with a screening apparatus to remove, at the source, the greatest mass of floatable solid matter, fats, oils and greases. By implementing this recovery technique, downstream mass removal is advantageously mitigated and the organic loads presented to the floatation, filtration and disinfection stages are reduced. This allows for efficient disinfectant usage and the demands of liquid/solid separation are lessened. In cases where the plant layout allows, the capture and recovery method is accomplished by custom designed collection devices located in close proximity to the source and connected by means of piping to a common collection header installed in the plant's existing trench drain system. Further details of the process water recovery sump and collection devices are provided below.

Mechanical Separation/Screening Device and Common Sump

The water collected from the desired source points flows and/or is pumped to the invention's second stage solids separation or screening device. The device consists of a rotary drum, self-cleaning type screening device where solids are captured on wedge wire or other suitable media and the water is allowed to pass through the screen's pores into a sump. The wedge wire mesh size may be varied to best suit the source stream. Additionally, the screening device may be configured in a single, double or triple drum configuration to allow for different sizes of mesh to sequentially remove solids. The screening device is also fitted with a high pressure, water spraying mechanism to allow for intermittent or, continuous washing of the screen mesh to prevent fouling due to buildup of solids and fats. In a preferred embodiment the screening device is configured as an internal loading screen where water is passed into the center of the drum and passes through a relatively larger mesh size followed by a smaller mesh size on the outer screen. This allows for different size solids to be removed in stages to prevent the fouling of the smaller mesh.

The screening device is driven by an electrical motor and may be fitted with variable speed drive to allow the operator to adjust the drum rotation speed for optimum performance. Varying the speed provides significant operating and performance enhancements by allowing the device to operate at the most efficient speed for washing off the solids. Further, the efficiency of the device can be improved by employment of a traveling spray nozzle. The traveling spray nozzle is installed on a bar fitted with limit switches to define and control the distance of travel of the spray nozzle. The spray nozzle can be driven back and forth across the travel bar by way of electric motor connected to a worm type gear or, by means of water pressure. The screening device is mounted on a sump for collection of the screened water. The sump is fitted with level sensors to control the rate of flow, retention time and any further designed overflow. The sump is also fitted with a dedicated pump to transport the screened water to the treatment system's downstream unit operations for further treatment. It is contemplated within the scope of this invention that other methods of screening debris within poultry processing may be used.

Process Water Surge and Floatation Device

Following passage through the screening device and recovery sump(s), the recovered process water is then advantageously pumped to a device designed to remove remaining floatable solids. The configuration and specific mechanism of the floatation device may employ conventional "dissolved air floatation," "induced air floatation" or, a combination of these techniques for the gas assisted floatation of organic materials such as fat, oil, proteins, lipids, carbohydrates and small solid particles. The floatation vessel also serves to act as a volume-balancing device for hydraulic flows through the system's unit operations. The floatation device serves two distinct functions: 1) it allows for continuous operation of the overall process by containing sufficient volume of water for treatment and, 2) it acts as a floatation and removal basin for the floatable solids, fats, oils and greases. The floatation device is advantageously sized to act as a volume buffer and control to accommodate the variability in source water flows and to assist the entire invention to achieve its desired treatment process rate. This sizing is to allow for the interruption of influent water into the treatment system during any processing downtimes such as breaks for the workers and maintenance shutdowns of the lines. The floatation device is ideally fitted with an air injection system that utilizes compressed air and small bubble diffusion to provide for positive lift for the colloidal oils, grease, fats, undissolved animal matter and proteins present in the stream. The floatation device may also be enhanced by injection of gaseous ozone to promote flocculation of solids as is well known in the art. This flocculation induced by the reaction of ozone is well documented in the literature. The floatation device may also be fed with coagulants, polymers, metal salts or other chemical agents for the purpose of assisting or enhancing solids removal. In one illustrative embodiment, the floated matter is removed from the tank by an overflow and skimming device. From there, the process water advantageously passes to the filtration modules which are selected on the basis of need.

Pre-Filtration Module:

The effluent water from the floatation device will be further treated to remove the smaller solid materials remaining after screening and floatation by means of filtration, electrocoagulation, membrane separation or comparable technology. This module is ideally designed to achieve removal of fats, oils and greases, suspended solids and any inorganic debris. The design according to the invention allows for single or multiple filter vessels or electrocoagulation reactors to be advantageously employed at this stage. Additionally, either vacuum type diatomaceous filtration vessels or, pressure type diatomaceous filtration vessels may be used. The present invention also allows for maximum flexibility in the selection of specific grades of the filtration aid, such as diatomaceous earth where diatomaceous earth filtration is employed. In the case of membrane separation, the specific membranes may be sequentially configured to allow for a multiple pass type of separation. Or, in the case of electrocoagulation, reactor size and power input may be varied to provide the maximum efficiency for particle destabilization and separation.

Fine Filtration Module:

Fine filtration of recovered process water is accomplished using diatomaceous earth or other filter media which is pre-coated onto a matrix or septum. This fine filtration allows for removal of particulate matter, some adsorption of the fats, oils and greases and suspended solids. Thereafter, the recovered process water is passed to the disinfection and oxidation module and then final polishing. It is contemplated within the scope of the invention that the use of single filtration or multiple vessels can be configured to operate in parallel. Fine filtration may also be configured to allow the use of membrane separation to achieve the desired final filtered water quality. Ideally, the effluent from the fine filtration vessel(s) is continuously monitored by on-line turbidimeters to assure that the target final quality is achieved. In a preferred embodiment, the turbidimeter(s) are interfaced with the main system control panel so that in the event the final water quality from the fine filtration vessel(s) does not meet the designed standard, the entire system can be shutdown by way of a signal feedback loop.

Final Polish

The treated water may be advantageously polished by means of a settling tank and/or passage through fine media or bag filter(s) or, activated carbon reactor. The need for final polishing will generally be dictated by the specific requirements imposed by the regulatory authorities.

Control and Automation

The process and equipment has the potential to self-regulate and self-monitor with little operator intervention. The use of a programmable logic controller provides the analog and digital input/output capability to continuously monitor and control the system, and to notify the operators of any system upsets and/or maintenance requirements. The process is ideally controlled via a control panel with illuminated displays showing all components operating conditions. The design of the main system control advantageously provides flexibility in choice of options to allow for varying degrees of automation and control sophistication.

Disinfection:

Generally, the treated recovered process water is disinfected by the use of a highly oxidative disinfectant such as ozone, followed by treatment with chloramines prior to its introduction into the chiller bath or other designated reuse point. The residual chloramine level of the treated water may be varied in specific dosage to allow for advantageous process application within the processing plant's operations. Again, the required levels of chloramines will generally be dictated by regulatory guidelines or the processors desired level for specific reuse point applications.

According to the invention, the use of chloramines increases disinfectant efficacy and thereby provides greater pathogen reduction within food processing systems. In the prior art, the efficacy of certain disinfectants is based on their ability to rapidly oxidize. Disinfectants with greater oxidation potentials often cause higher microbial reduction. However, the very characteristic that normally makes oxidative disinfectants effective, reduces their effectiveness in process water with a high organic load such as a poultry processing chiller environment.

The typical chlorine demand in a chiller is measured in thousand of parts per million. Because of its highly oxidative nature, free chlorine will rapidly oxidize, bleach or combine with any component. Most of the demand in a chiller is comprised of a wide variety of organic materials, which when combined with chlorine, form non-biocidal organic chloramines. These organic chloramines are viewed as having no disinfectant benefit and are considered to be potential trihalomehane (THM) precursors.

Because of the high organic load within the chiller, when highly reactive free chlorine is added to this environment it remains free for only a brief period of time. When this free chlorine combines with an organic substance, it ceases to be highly reactive and loses its ability to bleach. Therefore a biocide that is not so highly reactive can be far more effective within the poultry processing environment because it is not consumed by the resident chlorine demand, thereby remaining available to reduce the biological pathogens that may be present.

Without being bound to any particular theory, it is thought that a relatively small dose of a slow-reacting biocide results in a residual presence throughout the poultry processing environment that will outperform its highly oxidative counterpart, such as free chlorine, in reducing the overall microbial load.

This increased disinfection efficacy is attributable to chloramines' stability and persistence in water laden with organic materials. Conversely, other forms of free chlorine are consumed rapidly by the organic load, which results in the lack of a true free chlorine residual in any environment that has an unsatisfied chlorine demand. A typical chiller may have a chlorine demand of 1000 to 2000 ppm that cannot be overcome by 50 ppm of free chlorine in the make-up water.

Off-gassing of irritating chloramines can occur in prior art processing where the use of disinfectants such as highly reactive chlorine is not understood or properly controlled. There are basically three types of airborne irritants encountered in poultry plants that can be caused by chlorination.

One irritant is caused by the use of excessively high concentrations of chlorine (usually sodium hypochlorite) that results in detectable amounts escaping to the atmosphere. Another type of airborne irritant occurs when free chlorine combines with organic compounds to produce organochloramines, some of which are relatively insoluble and can cause odor problems in the plant. The third airborne irritant occurs in the presence of ammonia when the chlorine to ammonia ratio increases to a point where nitrogen trichloride is produced. Nitrogen trichloride is the only inorganic chloramine that can cause burning of the eyes. This condition is common to poultry plants that receive chloraminated water from a municipal treatment plant and then treat the water again with a source of free chlorine. The addition of free chlorine to chloraminated water can cause detrimental off-gassing and should be avoided.

According to the inventive method, the above hazards are avoided by using a biocidal species of combined chlorine made outside the processing environment and then added to the processing system. This combined chlorine is formed from the reaction between ammonia and free chlorine. It is contemplated within the scope of this invention that the free chlorine can be in the form of elemental chlorine, hypochlorous acid or hypochlorite ion, either alone or in combination within each other.

The combination of the free chlorine with ammonia forms chloramines that can exist in different forms depending upon the ratio of the mixture, as measured in parts per million, of ammonia and free chlorine. The three forms of chloramines include monochloramine, dichloramine and trichloramine. The various chloramines are formed by changing the ratio of free chlorine to ammonia. Monochloramine is formed by combining about 5 parts or less of free chlorine with about 1 part ammonia-nitrogen. Dichloramine will also be present in the solution when the chlorine to ammonia-nitrogen ratio exceeds 5:1. At ratios greater than 10:1 trichloramine (i.e., nitrogen trichloride) will also be formed.

Trichloramine is undesirable as it is extremely insoluble in water, is easily stripped out of solution by aeration, has a foul odor and is the only species of chloramines that can burn the eyes. These undesirable properties of trichloramines preclude their use within the invention process. As trichloramines are produced at high chlorine to ammonia ratios it is an object of the present invention to avoid free chlorine to ammonia ratios greater than about 10:1.

Monochloramine is tasteless and odorless and has advantageous biocidal properties. While dichloramine has about twice the biocidal capability as monochloramine, it cannot exist in solution without monochloramine. When the dichloramine concentration is too high, however, an odor problem can occur. It is an object of the present invention that the chloramines exist within the inventive process preferably in a ratio of monochloramines to dichloramines in a mixture ratio of about 1:0 to about 1:1 respectively; however, other blend ratios may also be applied. It is contemplated within the scope of this invention that monochloramine may be used exclusively within the inventive process or in combination with dichloramine.

However, if a 100 percent solution of monochloramine is produced it will slowly hydrolyze over a period of time until is reaches a state of equilibrium comprised of nominally equimolar concentrations of monochloramine, dichloramine and free chlorine. This state of equilibrium does not in itself produce offensive odors. The chlorine to ammonia weight ratio must be such that the residence time in the chiller does not allow for the production of sufficient concentrations of dichloramine or reactive free chlorine to cause odor problems.

The pH of the solution within the poultry processing plant effects the relative concentrations of monochlormaine and dichloramine at equilibrium. A lower pH favors dichloramine while a higher pH favors monochloramine. Typically, pH ranges in a poultry processing system vary from about 6.5 to 8.0 which will accommodate an acceptable monochloramine to dichloramine ratio. It is contemplated within the scope of the invention that monitoring and control of the pH of the processing medium may be undertaken to optimize the ratio of monochloramine to dichloramine and therefore the biocidal properties of the chloramines. Further to prevent unwanted reactions with free chlorine and excessive levels of dichloramine that may result in worker hazard it may be necessary to control the pH within acceptable levels.

The control of the pH may vary plant to plant depending upon problems the plant may have with pathogen control. If the plant needs greater pathogen control a pH range producing an acceptable elevated level of dichloramine may be utilized for selected intervention points.

Monochloramine according to the invention can be made for single concentration applications directly in the potable water supply line. Alternatively, monochloramine can be made as a dilute solution (nominally 0.1 to 1.0%) in a make down station located outside the processing plant. The raw materials required for manufacturing monochloramine include a source for chlorine and a source for ammonia. The chlorine can be provided by chlorine gas or calcium, potassium, or sodium hypochlorite. The ammonia is typically provided by anhydrous ammonia, ammonium hydroxide or ammonium chloride. It is contemplated within the scope of the invention that other raw materials known in the art may also be used.

For food processing applications raw materials are NSP or FCC certified grades and received in either gas cylinders, bags, drums or liquid totes. These raw materials are dosed from their containers either directly into the fresh water supply line or into a dedicated storage or mix tank outside of the poultry processing plant so that no worker exposure is required. The make down station is isolated from the processing plant and is well ventilated. The monochloramine solution mix tank according to the invention is covered as a safety precaution in the event of off-gassing.

Each batch of monochloramine solution is formulated to ensure the proper mix ratio of raw materials and to verify the desired monochloramine concentration and solution stability prior to releasing the solution for feed to the point(s) of use.

Once the correct monochloramine solution has been verified through a control system it is fed to the points of use typically within the chiller system and diluted further in the process so as to yield a final concentration of monochloramine not to exceed about 50 ppm or other levels set by regulatory guidelines or preference of the processor. It is contemplated within the scope of the invention that continuous on line monitors positioned throughout the poultry processing plant will monitor the monochloramine concentration in each process water application to continuously maintain effective biocidal levels.

Manufacture and Injection of Chloramines

The present invention provides several methodologies developed to manufacture chloramines in various predicted concentrations and chlorine to ammonia ratios, and to introduce them into food processing water or into any aqueous medium for the production of ice.

Figure 9:
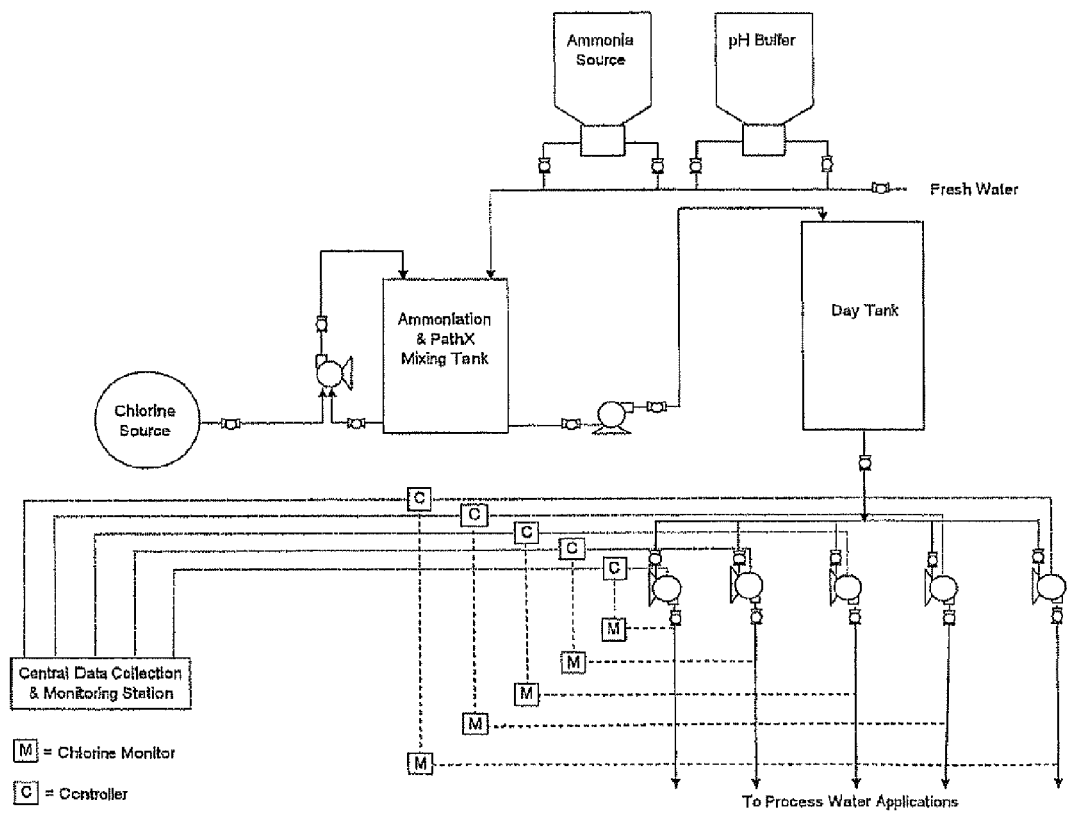

In an illustrative embodiment with general reference to FIG. 9, one manufacturing methodology according to the invention produces batch quantities of chloramines by mixing two volumes of water, one containing a source of free chlorine and the other containing ammonia, such that when they are brought together the desired chlorine to ammonia ratio is achieved. In this approach, the batch concentrations can be readily varied by altering the concentrations of the two component solutions. This inventive method has a number of economic and practical advantages over the traditional in-pipe manufacturing approach, which is used to produce chloramines in potable water treatment plants. According to the invention, the chloramine solution can be manufactured at a relatively high concentration and then diluted in various process streams so that multiple processes can be treated at different concentrations. This method precludes necessitating a separate manufacturing unit for each application point.

In reference to FIG. 9, a source of ammonia and a pH buffer, if required, are added to the ammoniation and monochloramine mixing tank and filled with fresh water to a predetermined level. A volume of chlorinated water is then added to the tank such that when the two solutions are mixed, the desired concentration of monochloramine is produced. The raw materials required to manufacture both the chlorinated and the ammoniated water solutions can be in gas, liquid or solid forms.

The monochloramine solution is injected into applicable food processing water streams. The chloramine concentration is monitored after each injection point by a combined chlorine monitor for fresh water applications or by a total (red-water) chlorine monitor for applications with a high organic load, such as in a poultry chiller. Each monitor provides continuous electrical feedback to a controller, which regulates the associated metering pump to keep the chloramine concentration within specified selected parameters. The controller also sends electrical signals to a central data collection and monitoring station for both real-time monitoring and for historical data collection and evaluation. It is contemplated within the scope of the invention that the central data collection can be accessed via telemetry for remote monitoring and data collection.

In an alternative illustrative embodiment a desired chloramine concentration is prepared by the introduction of an ammoniated solution and a chlorinated solution in predetermined ratios into a high-speed mixer to achieve a specified concentration of chloramine.

In a further alternative illustrative embodiment a desired chloramine concentration is prepared by the joining of an ammoniated stream of water and a chlorinated stream of water at controlled flow rates into an inline static mixer.

In yet a further alternative illustrative embodiment a desired chloramine concentration is prepared by the injection of a high concentration of chlorine into an ammoniated water stream.

In a further alternative illustrative embodiment a desired chloramine concentration is prepared by the injection of a high concentration of ammonia/ammonium ion solution into a chlorinated water stream. It is contemplated within the scope of this invention that other methods of manufacturing and injecting chloramines known in the art may be used.

Poultry Scalder

In a further illustrative embodiment, another important point of application for the inventive disinfectant process is within the poultry scalder. The poultry scalder tank is one of the very initial steps in the slaughter process and one of the points in which the water is extremely heavy with organic materials. Water in the scalder has an extremely high organic load, high microbial population and high temperature. The scalder is a communal tank holding numerous carcasses at any point in time, which provides great potential for cross contamination. The conditions in the scalder (i.e., high organic load and high temperature) cause the rapid consumption of free chlorine within traditional poultry processing systems, which significantly degrades the disinfection potential of the chlorine. Monochloramine and dichloramine on the other hand are well-suited disinfecting agents for this harsh environment.

In yet another illustrative embodiment, the inventive method can be used within the evisceration line and various wash cabinets on the processing line in which recycled water is being used. These points of treatment are between the scalder at one end and the chiller at the other end of a typical poultry processing plant. USDA regulations allow poultry processors to recondition process wastewater to specific treatment standards and then reuse that water in the production process. While this reuse water is typically pathogen free and often has a turbidity level comparable to potable water, the reuse water does have higher levels of soluble organic loading than found in fresh water. Because of this organic loading, any applied free chlorine will be rapidly consumed, precluding the establishment of a residual. The lack of a residual disinfectant will enable bacterial regeneration in the storage and distribution systems. This invention therefore enhances the economic viability and effectiveness of water reuse systems.

On-Line Safety Assurance:

The system is preferably fitted with a turbidimeter which permits instantaneous shut down of the process in the event of a rise in turbidity of the treated water beyond predetermined levels. This would permit the operator to take appropriate remedial action, analyze the water for the presence of pathogens or contaminants and assure that the quality of water introduced into the chiller bath, or other designated reuse points, meets appropriate "safe for the intended use" criteria.

On-Line Backup:

The process is advantageously fitted into the manufacturer's plant's operation with suitable float switches and valves allowing for the introduction of exterior potable water in the event that there are any process system malfunctions, upsets or power interruptions. This would then ensure that processing of the food product would not be interrupted by any recovery system upsets.

Advantages of the Water Recovery System

The processes of the present invention provide several significant and unexpected advantages over conventional treatment processes including improved food safety and improved process economics. The invention, in a preferred embodiment, is designed to operate in a cascade type flow where water is recovered "downstream" from evisceration and carcass washing operations and is treated and then reused in "upstream operations" such as scalding, picking, stunning and flume type operations. Additionally, the treated water may be reused in chiller makeup operations, sanitation wash and other approved reuse applications. Avoidance of closed loop applications of reuse water is seen as both desirable and prudent for a number of reasons: 1) due to the inorganic species found in poultry process water (i.e., specifically high phosphorous levels and calcium from the processor's water supply) the potential for unwanted precipitation of calcium phosphate or, other deposits on poultry product or plant equipment can be mitigated, 2) the inherent food safety advantages in "cascading" reuse water to points not used in recovery mitigates the potential for cross contamination, and 3) avoidance of cycling up or, concentration of unwanted organic compounds that could potentially have a negative impact on product contact or, non-product contact applications.

In such situations, limiting the collected water for treatment to include ranges approximating from one (1) to about ninety (90) percent chiller water is beneficial to prevent or limit the possibilities of contamination due to the above stated reasons. Further, limiting the collected water for treatment to approximately between twenty (20) and forty (40) percent has been found to be ideal, although higher percentages are clearly contemplated in this disclosure providing that the treated water meets the above stated criteria.

Accordingly, by avoiding exclusive reuse of the chiller bath water, using the process of the present invention, safety of the food product is enhanced because the water quality of the recovered carcass final rinse and other relatively low load source streams is significantly better than the quality of the water contained in the poultry chiller. This is in part due to the fact that the final wash water is in one-time contact with the final product and therefore has not had a long contact time with the food product to leach into solution additional fats, oils and grease. Thus, by reusing downstream processing water and, more importantly, avoiding reuse of the upstream chiller water or water from an initial wash step, significant increased safety is imparted to the process.

Additional food safety benefits are offered by the invention due to the fact that advantageously dosed chloraminated water is being returned to a number of "upstream operations" such as scalding, picking, stunning and flume type operations. The treated reuse water being directed to these reuse points is treated with chloramines at an advantageous dosage. It was surprisingly discovered that such advantageously dosed chloraminated reuse water is beneficial to the reduction in microorganisms on the carcasses being processed using said reuse water.

In an illustrative embodiment and as will be apparent from alternative illustrative embodiments disclosed herein, the reuse water is chloraminated with an advantageous dosage of monochloramine or a combination of monochloramine and dichloramine and is reintroduced "upstream" such as in the scalder or similar heated portion of the processing steps. During the scalding or heated processing steps, the pores and tissue membranes of the carcasses are open and are more readily receiving of the surrounding water, i.e., the reintroduced chloraminated water. The reintroduction of the chloraminated reuse water into the scalder or similar heated processing step causes a dramatic reduction in the levels of microorganisms associated with the carcasses that has not been found in the prior art.

Additionally, by avoiding chiller bath water as an exclusive reuse water source, the relative economics become significantly more favorable to the end user due to the fact that later streams such as the final carcass stream contain significantly less contamination mass. Because the economics of treatment are largely dependent upon the mass of compounds to be removed, by significantly diluting any chiller water with water from other sources or by eliminating chiller water entirely as a reuse water source, the contaminated load on the purification process is significantly lessened and with it the concomitant cost.

Recovery Sump

The present invention also provides a methodology developed to recover poultry wash water from various stages of the product processing operations where water is captured from the wash or rinse cabinet(s). Such techniques are optionally employed in integrated water treatment systems directed at maximum recovery, treatment and reuse of such process water, such as that described herein. Such techniques are best employed in those plants where plant logistics are complex and plant trench drain systems are not available.

The device of the present invention allows for maximum removal of solid matter, floatable fats, oils, and grease, animal parts including skin, small body parts and detritus. The early removal of these constituents at or close to the source of the water from wash or rinse cabinets provides far greater efficiency and reduces significantly the complexity of treatment components in the later treatment stages of the integrated water recovery process. It was surprisingly discovered that by removing a greater mass of constituents at, or close to the recovery source, a greater impact on downstream water treatment economics was obtained.

An illustrative embodiment is capable of collecting water from a typical poultry slaughter line wash station. A primary function of this apparatus is to provide a collection basin for the wastewater from the carcass wash cabinets and other source points. A secondary function of the apparatus is to provide for a hydraulic design that allows a continuous skimming of the floatable solids, fats, oils and grease that are the typical contaminants found in such waste streams. The apparatus also serves as the point where the water, after solids removal, is transferred from the processing floor to a treatment system located outside the processing facility for further treatment.

Figure 2:
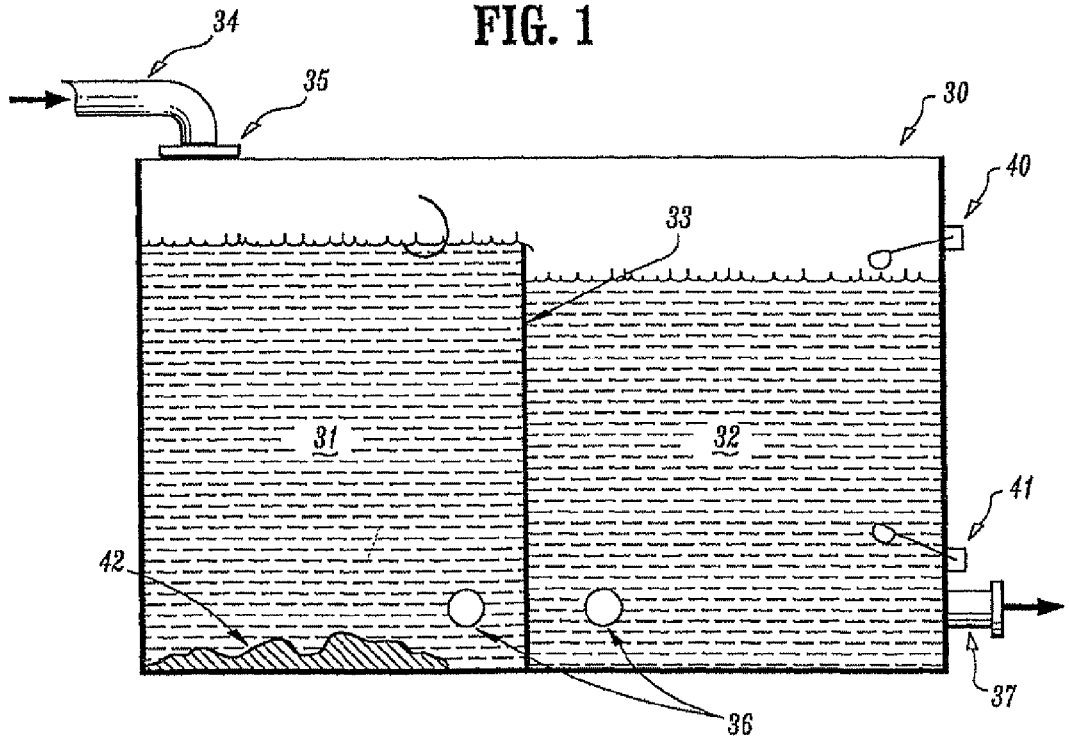

In an illustrative embodiment and with general reference to FIGS. 1 and 2, the device comprises a specially designed stainless steel sump containing floatation chambers, weirs, screens and clarified water flow channels. While the exact dimensions of this device can be advantageously varied from application to application, all such devices would ideally include most, if not all, of the following features: a main sump vessel, a screened top, overflow ports, weirs and slant plates, a deep sump, float sensors and a system transfer pump.

The apparatus comprises a rectangular, welded basin 30 of a size and volume to permit proper hydraulic flow and overflow for the specific waste streams to be collected and transferred. The basin 30 is fitted with configured baffles 33 to separate the turbulent flow section 31 (associated with waste stream collection) from the relatively quiescent portion 32 from which the water may be pumped for further treatment. The number and configuration of the baffles is application specific and, to a large extent, will depend upon the volume of water to be collected and transferred.

The apparatus is also fitted with a skimming device 39 consisting of a "half-shell" stainless steel tube or weir pipe. The tube skimmer 39 is adjustable in its vertical orientation to allow for fine-tuning to the specific application intended. The number and location of these skimming tubes will also depend upon the volume of water and flow velocity for a specific application. The end of the weir pipe 38 communicates with a drain allowing removal of skimmed solids. The apparatus is also advantageously fitted with a mesh screen 35 located at inlet 34 to prevent the entry of large solids (animal parts, skin and other gross solid matter) from fouling or clogging the collection sump and attached piping.

To facilitate operation of the apparatus as an integral part of a wastewater treatment system, the device is also fitted with level sensors 40 and 41 to actuate the attached transfer pump (not shown) only when the desired water level is reached. The sensors also shut down the pump when the water level has fallen below the "low level" setting to prevent the pump from dry cycling which may cause damage to the motor and other components. The device is fitted with outlet fitting 37 to which the pump suction is attached to enable transfer of the collected, treated water and drain plugs 36 to allow for ease of cleaning during the plant's sanitation procedure and removal of collected solids 42. The materials of construction of basin 30 are ideally stainless steel in order to conform to the USDA criteria for food processing equipment.

Operation of the Water Recovery System

Figure 3:
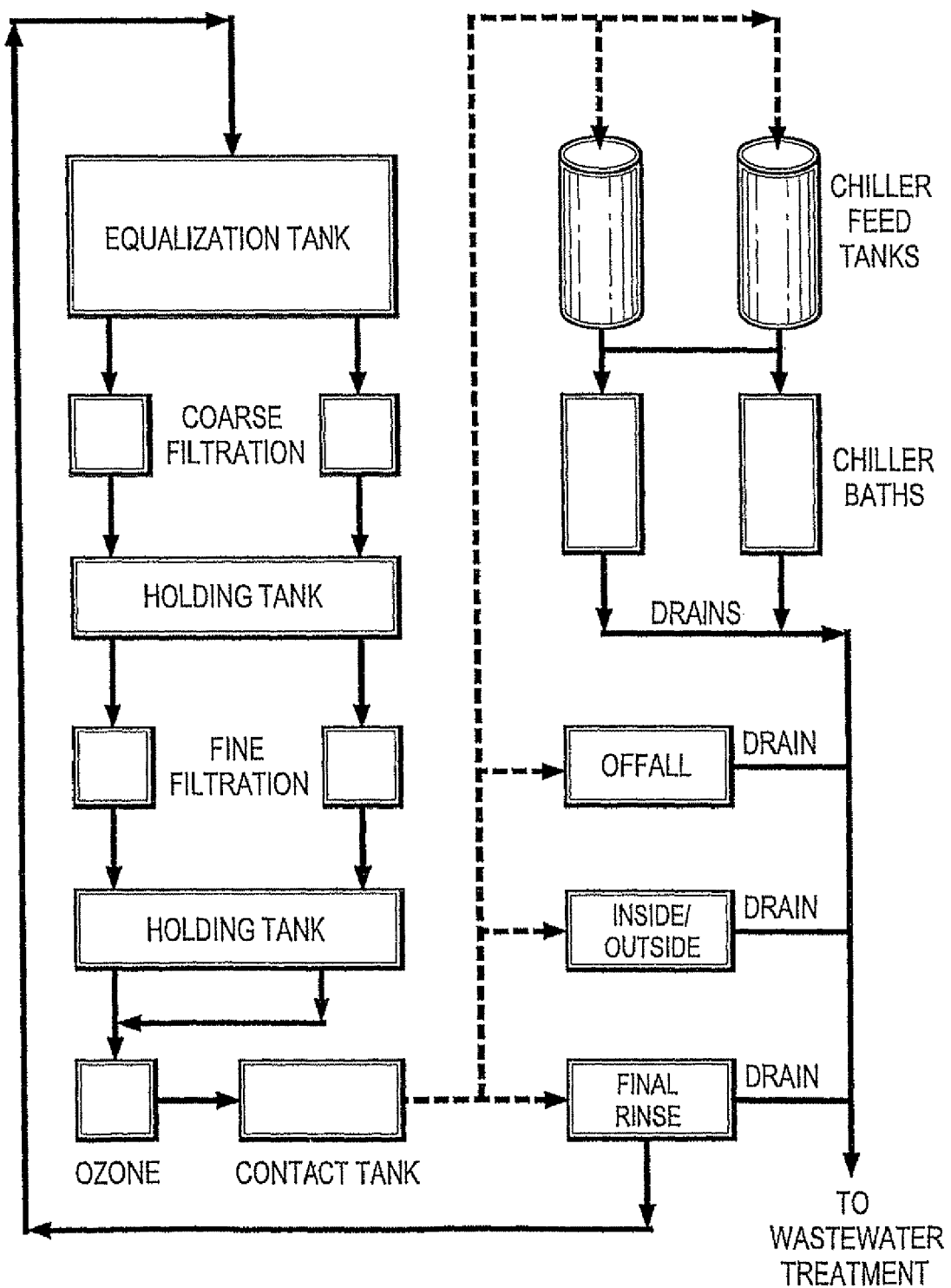
Figure 4:
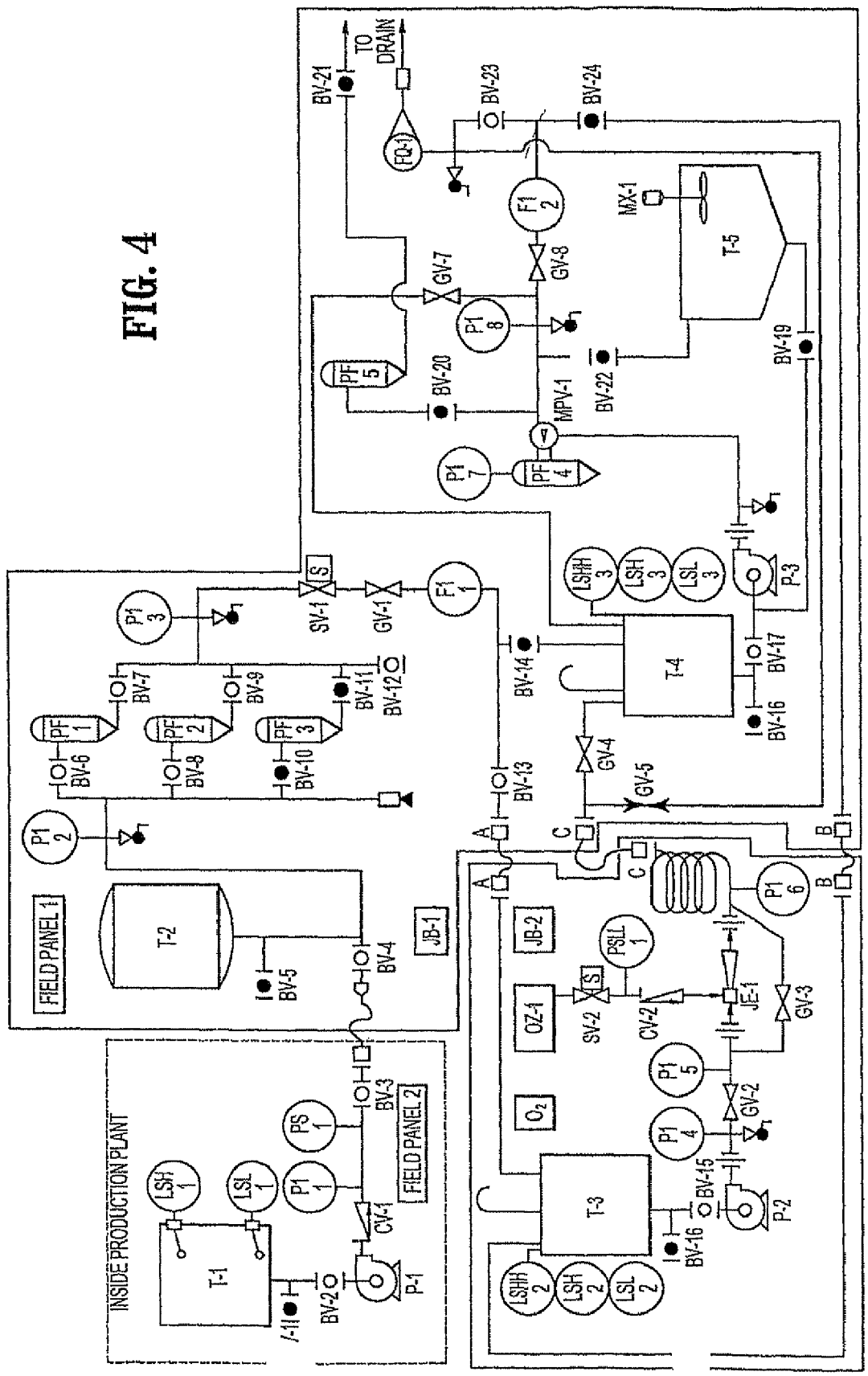
Figure 5:
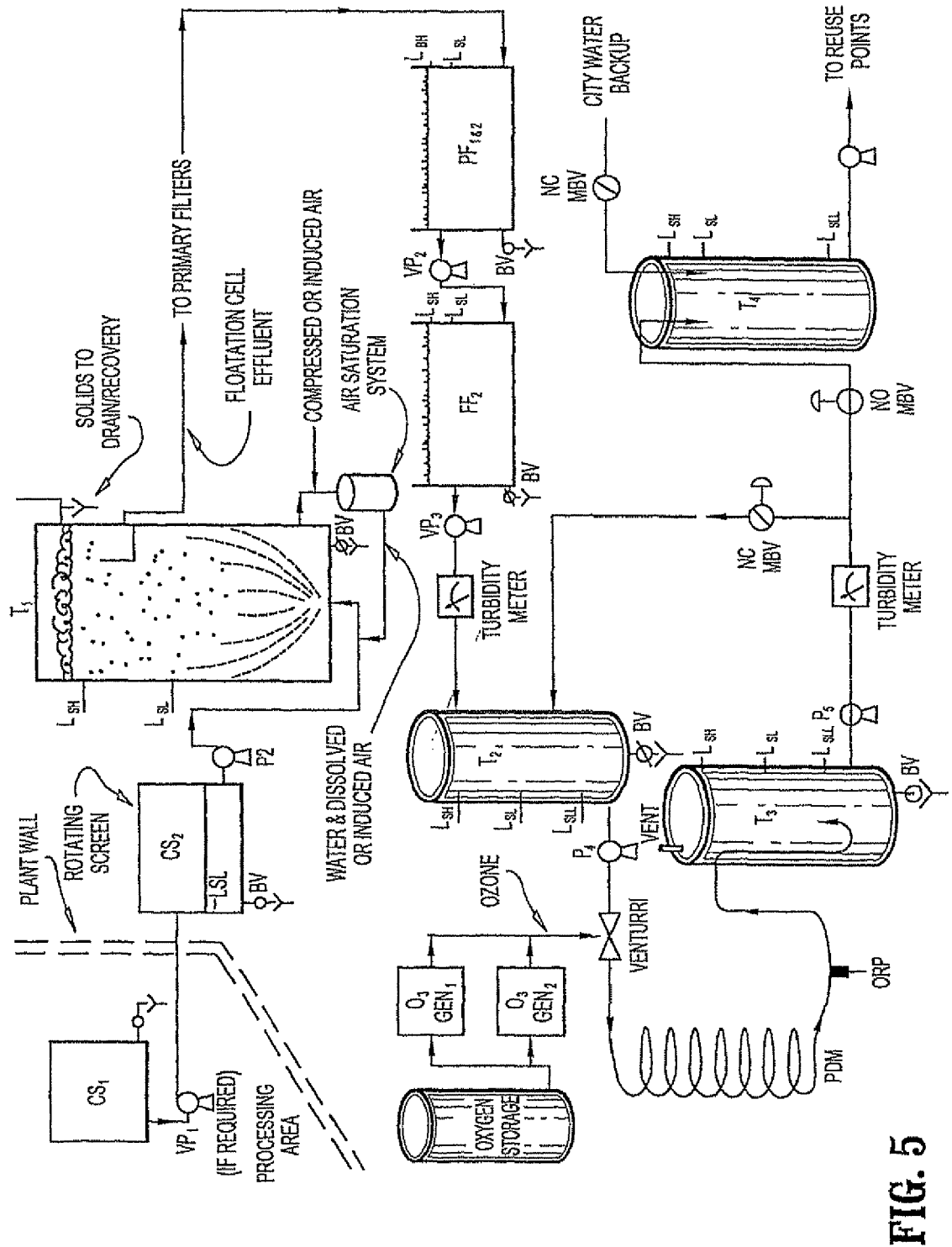

With reference to FIGS. 3-5, the treatment process is designed to deliver a final quality of water that is safe for intended use as carcass or bird chiller makeup water, evisceration wash water, inside/outside wash water, sanitation cleanup water or use at any other point requiring a high quality, pathogen free, chlorinated wash or rinse water source. The present invention capitalizes on the discovery that the carcass washing in inside/outside carcass wash cabinets, "water rails," organ or paw transport flumes and final rinse stages represent the cleanest sources of potential reuse water available in high volume and that the treated water from the proposed treatment system will deliver water meeting quality standards established by the Food Safety Inspection Service (FSIS) of the U.S. Department of Agriculture (see FSIS Directive 11000.1, Water Supply and Water, Ice and Solutions Reuse, 9 CFR 416.2(g), as well as 40 CFR Part 141—National Primary Drinking Water Regulations).

The preferred source for reconditioning process water is secondary or tertiary treated wastewater. Alternatively, in cases where the plant layout allows, the capture and recovery of source water is accomplished by custom designed collection devices located in close proximity to the source and connected by means of piping to a common collection header installed in the plant's existing trench drain system. In cases where this is not possible, the recovery sump device (to be described later herein) is used as the initial collection point for source water.

The recovery sump device is ideally located under or adjacent to the poultry plant's wash or rinse cabinets and is situated such that the wash or rinse water, after being sprayed (using typical spray nozzles) onto the animal carcass, is captured in the main sump. This water contains at this stage, high levels of solid materials including fat, skin, small animal parts, oils and grease as well as other organic and inorganic materials (contaminants) being washed off the carcass. The contaminant laden water then flows over and through the screened main sump top where gross solids are captured and allowed, by way of the angle of orientation, to be continuously washed off the recovery sump device into the plant's wastewater trough or piping. The water is then permitted to gravity flow over the recovery sump weirs which are fitted with channeling devices to promote the removal of "floatable" contaminants. Again, these contaminants are ideally removed from the device and flushed into the plant's wastewater drain system.

The device preferably contains level sensors; low level and high level, to activate the devices transfer pump. The level of water contained in the device will dictate when the device is in overflow mode. Overflow mode is the level where water containing the "floatable" contaminants is higher than the sump's overflow ports, which are sized to allow for large pieces of material to be efficiently floated out of the system. The overflow level also ensures that the water in the device has had sufficient residence time to allow the "floatable" contaminants to reach the surface of the water. The device activates the transfer pump when the high level sensor indicates that the overflow mode has been achieved. The actual settings of these sensors are advantageously calibrated during installation of the device to allow for application specific conditions. The water captured in the device is flowed (by gravity) through a series of different vertical height weirs which act as the traps for solid, floatable contaminants. These weirs have flow channels in the bottom which allow for "clarified water" to flow. Each section of the device is designed to remove successively smaller (in mass) contaminant particles.

The collected water is then pumped by way of a vacuum type, pump(s) to the treatment system's common collection and rotary screening device for additional solids separation and removal ideally located outside of the main plant. The main influent/floatation tank ideally is fitted with dissolved air floatation or, induced air floatation which utilizes compressed air introduced into the floatation chamber by gas/liquid injection device(s) to promote flotation of suspended solid material (largely fats, oils, grease and animal matter). The skimmed product may be captured and recovered for rendering. This tank serves as the main reservoir and surge tank allowing for smoothing of volumetric flows during the plant's operations.

The treatment system comprises five major component arrays including source point collection/solid separation, primary screening, floatation/aeration, primary filtration, fine filtration and disinfection. The primary filtration module is comprised of vacuum type, diatomaceous earth or other filtration media vessel(s), electrocoagulation reactor(s) or membrane separation modules. The media used in these vessels can be standard, commercial grade diatomaceous earth or other filtration media, which is ideally "precoated" onto the vessel's stainless steel matrix septum.

The water is filtered to remove further organic content including fats, oils and grease. The primary filtration module can be re-circulated at a higher rate than the process to allow for multiple pass type filtrations. The primary filtration modules can be operated in parallel or sequentially to promote maximum removal of solids, fats, oils and grease. This module can be configured with redundant (backup) module(s) that are ideally controlled by the systems main control panel. Such that, when the pressure differential exceeds the design parameters programmed into the control panel's programmable logic controller, an alarm is activated to notify the operator that the filtration module is approaching a fully loaded stage. The alarm will not shut down the system unless the on-line turbidimeter reaches a predetermined high level. The on-line turbidimeter can perform either system shutdown or, activation of a motorized ball valve to shunt the flow to the standby filtration module. The water from the primary filter module is then pumped to an intermediate tank (for example, 3000 gallons) where settling and equalization is accomplished and this tank serves as a smoothing station for the system to allow for a continuous, batch type operation.

Filtered water from the first intermediate-tank or alternately from the primary filtration module is pumped to the final polishing module by way of a centrifugal, end suction, top discharge type pump. The final filtration module comprises a vacuum type, diatomaceous earth or other filtration vessel and is precoated with a blend of standard commercial grade diatomaceous earth or other filtration media and an absorbent, cellulose type media. Alternative devices such as membrane separation devices or multi-media filtration modules may be employed where water quality dictates their efficacy.

The final polishing module is advantageously fitted with a Hach (or equivalent) on-line turbidimeter to continuously monitor the turbidity of the filtered water. These filters are designed to remove further organic material, fats, oils and grease. This module can be fitted with a backup module to allow for "hot" switching in the event that the pressure differential exceeds the programmed high level. The pressure/vacuum differential is monitored and will activate an alarm condition at a predetermined set point. Again, this alarm will not shut down the system unless other parameters are exceeded. The alarm is to notify the operator that the filters are reaching the loaded stage. Most preferably the final filtered water then enters a second intermediate tank, which serves as an equalization tank and settling basin, however, this step may be optionally eliminated.

The filtered water is then pumped by a centrifugal, end suction, top discharge pump to the disinfection system. Primary disinfection is normally accomplished by a highly oxidative disinfectant such as ozone, which effectively reduces the bacterial level to zero. A residual disinfectant is then provided by the introduction of chloramines that are prepared outside of the processing plant into the filtered water as discussed above. Chloramines are generated by the mixture of free chlorine and ammonia in a nominal molar ratio that is about 1:2 to about 2:1. Chloramines are ideally controlled to achieve the desired disinfection standard determined by microbiological analysis at various set points to assure that the water is pathogen free. The International Bottled Water Association (IBWA) and others state that, at this level of oxidation, the water is deemed sterile by drinking water standards and that microbiological activity is eliminated. An alarm is activated if chloramines levels fall below the programmed set point and the system can be shut down.

The treated effluent from the system will then be advantageously piped to the plant's bird chiller storage tanks for use as bird chiller makeup or to additional reuse points including but not limited to the scalder, evisceration wash water, defeathering wash water, inside-outside carcass wash, and sanitation cleanup water to allow maximum volumetric reuse.

Control of the treatment system's operations is preferably accomplished by way of a Programmable Logic Controller (PLC). The Main Control Panel continuously monitors the treatment system's operations and performance using digital and analog inputs designed to monitor total volumetric flow (pulse type, digital flowmeter with totalizer), pressure differential sensors fitted to both primary filtration modules and final filtration modules, turbidity at effluent of primary filtration and at effluent of the ozone contact tank. An ambient chloramine monitor is also preferably installed adjacent to the plant's bird chillers, or other acceptable reuse points, to continuously monitor chloramines levels. All controls and safety devices are ideally interfaced with the main operating control panel and designed to notify the plant operator in the event of any system upset and interlock the system in the event that the final water quality fails to meet the standards established above.

Additional Reuse Water Quality Assurance & Safety Considerations

With particular reference to FIGS. 4 and 5, the treatment system is fitted with various monitoring and safety devices such as a solenoid shut-off valve fitted at the reuse water fill line to the bird chiller water storage tank. The solenoid valve is activated to close in the event that the predetermined water quality standard is not met. The bird chiller water storage tank and/or the treatment system's final product storage tank is also fitted with a backflow prevention valve on the municipal water inlet pipe to prevent backflow of the treated reuse water into the main municipal water line. Secondly, each filtration module is fitted with pressure/vacuum differential sensors to continuously monitor the performance of filtration. Alarm indicator lights are fitted to the systems remote monitoring panel to enunciate alarm status when pressure/vacuum differential readings are out of the prescribed ranges, when turbidity of primary filtration is out of range and for effluent turbidity in NTU's. The treatment system continuously monitors turbidity at the discharge to the bird chiller storage tanks or other designated reuse points and is interfaced with the main system control panel to shut down the system in the event the final quality exceeds the target level of NTU's at which time, water from the treatment system can be recirculated within the treatment system or, diverted to the plant's main wastewater drain. The key to FIG. 4, which depicts a conventional engineering flow chart of a preferred treatment process, is as follows:

1 ID LABEL DESCRIPTION F1-1 & F1-2 Flow Indicator FQ-1 Flow Totalizer JE-1 Jet Inductor LSH-1 Level Switch High LSL-1 Level Switch Low LSHH-2 & LSHH-3 Level Switch Hi-Hi LSH-2 & LSH-3 Level Switch High LSL-2 & LSL-3 Level Switch Low MX-1 Mixer CG-1 Chloramine Generator P-1 thru P-3 Centrifugal Pump PF-1 & PF-2 Particulate Filter PF-3 Particulate Filter PF-4 Particulate Filter PF-5 Particulate Filter PI-1 thru PI-8 Pressure Indicator SV-1 Solenoid Valve SV-2 Solenoid Valve T-1 Collection Tank T-2 Pressurized Tank T-3 & T-4 Surge Tank T-5 Slurry Tank BV-# (black circle) Motorized Ball Valve—normally closed BV-# (open circle) Motorized Ball Valve—normally open The ball valves are ideally controlled through the programmable processor control based on readings obtained from monitoring sensors and level switches. Control is designed to ensure adequate supplies of water at each stage of the system and that turbidity, NTU and microbiological load requirements are continuously met.

FIG. 5 depicts a flow chart of a preferred embodiment of the treatment process. In addition, FIG. 5, in a comparison to the process shown in FIG. 2, demonstrates the advantageous flexibility inherent in the treatment and recovery process of the invention and the ability to use different components at certain stages of the process to accomplish desired goals. Still other substitutions can be made, such as using electrocoagulation or other filtration technologies to accomplish the filtration effected by diatomaceous earth filters. The key to FIG. 5 is:

2 ID LABEL DESCRIPTION P Pump CS Collection Sump VP Vacuum Pump T Tank LSL Level Sensor Low LSH Level Sensor High PF Pre-Filter (diatomaceous earth) MBV Motorized Ball Valve FF (1 & 2) Final Filter FF (3 & 4) On-line Standby Final Filters Added as Needed PDM Pressure Dwell Manifold O3 Gen (1 & 2) Ozone Generators BV Ball Valve LSLL Level Sensor Low-Low NC Normally closed NO Normally Open Additionally, the disinfection module is continuously monitored using a chloramine probe and monitor. A low chloramine alarm is enunciated on the remote monitoring panel to indicate system fault should the chloramines levels fall below the site-specific level. The chloramine monitor and controller will immediately shut down the system in the event that chloramine levels fall below site specific low level chloramine reading and the system will be placed in alarm shutdown mode.

The treatment system according to the present disclosure is designed to be operated continuously during the plant's processing operations and the system is ideally designed to undergo sanitation during the plant's sanitation shift. To ensure integrity of the system, all piping from the system's collection devices will be labeled clearly as "REUSE WATER" for ease of identification, and all materials of construction and media coming in contact with the recovered water have been selected to comply with FSIS Food Safety Standards. With the exception of the system's recovery and collection devices and in-plant piping to the treatment system, components are advantageously located outside of the processing facility.

In the embodiments of the treatment systems and methods described above, there have been found unexpected results as a consequence of operating experience with the present disclosure. By focusing on cleaner sources of water primarily from non-chilling steps with lighter organic loads the treatment processes of the system described are less expensive and more economically viable than systems described by others. Carcasses processed with reuse water from a system produced by the teachings of this invention have significantly less potential to be adulterated with precipitated inorganic or organic material, avoiding precipitation of such materials on poultry carcasses or processing equipment if reuse water is cycled too many times. A water reuse system that meets or exceeds food safety and regulatory guidelines adds economic value to the poultry processor. The results of using such reclaimed and properly chloraminated treated water are further observed in the reduction of pathogens found on the carcass after evisceration and chilling. The reduction in pathogens is an important step in food safety, and has direct impact on liability and consumer safety.

Further, while some of the major benefits of the system are the conservation of large volumes of water and reduction of pathogens, a number of additional food safety and quality benefits are readily apparent. Such benefits and results include a significant improvement in the "picking" and "scalding" operations by the addition of the treated and recycled water to the pickers and scalders, that is, the point in the processing where the feathers are removed from the carcasses. By the addition of the treated and recycled water to the Pickers and Scalders, the overall effectiveness of the scalding and picking operations has been improved dramatically.

In addition to a reduction in microorganisms in the process, the carcasses are retaining more of their natural fat which means a higher weight per carcass which translates directly to higher prices per carcass.

The reuse process involves the segregated recovery of specific water streams used in the evisceration and chilling processes and then treatment via a proprietary process of screening, floatation, filtration, disinfection, and treatment with chloramines. The process produces the product that is allowed by the USDA for return to poultry processing plant for direct product contact. When such water is used as replacement source water in the scalding and picking operations, efficiency of defeathering operation is significantly enhanced to the point of being a preferred method by such processing plants.

It is also contemplated within the present disclosure that a separate surfactant or surface-active substance may be added to water used with any of the poultry processing steps. The addition of the separate surfactant or surface-active substance will also reduce the surface tension of the water, which enhances the ability of the water to infiltrate the pores and skin membranes of the poultry. Surfactants or surface-active substances are known outside the food processing arts. Those surfactants or surface-active substances which may be readily and safely used with the processing of foodstuffs are expressly contemplated by the present disclosure.

Example 1

In a carefully controlled experiments, 270 broiler carcasses were collected fresh prior to a chiller in a commercial processing facility to evaluate 90 per day in each of three separate days. Three replicate experiments were conducted each day comparing the efficacies of monochloramine, sodium hypochlorite (bleach) and tap water in reducing specific bacteria of interest. The carcasses were inoculated and/or temperature abused to ensure sufficient quantities of the bacteria to be evaluated adhered to the skin. The bacteria used in this experiment were *Salmonella enteritidis* (a pathogen), *Pseudomonas fluorescens* (a spoilage bacteria), and *Escherichia coli* (a pathogen). Following attachment of the 10 bacteria to the skin, the carcasses were placed in pilot scale poultry chillers containing one of the three treatments to be evaluated. The carcasses remained in the chillers for about 1 hour and were then removed and sampled for the bacteria of interest.

Figure 6:
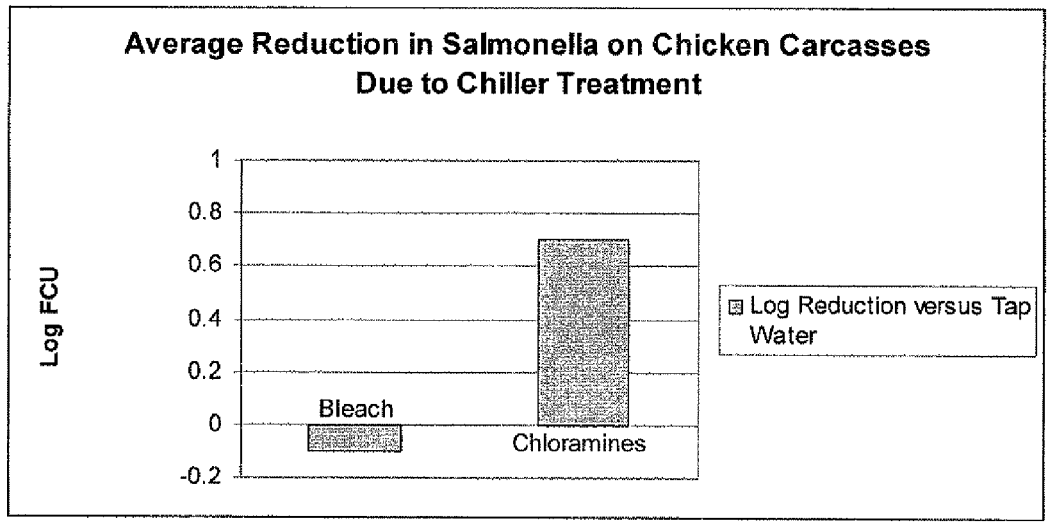
Figure 7:
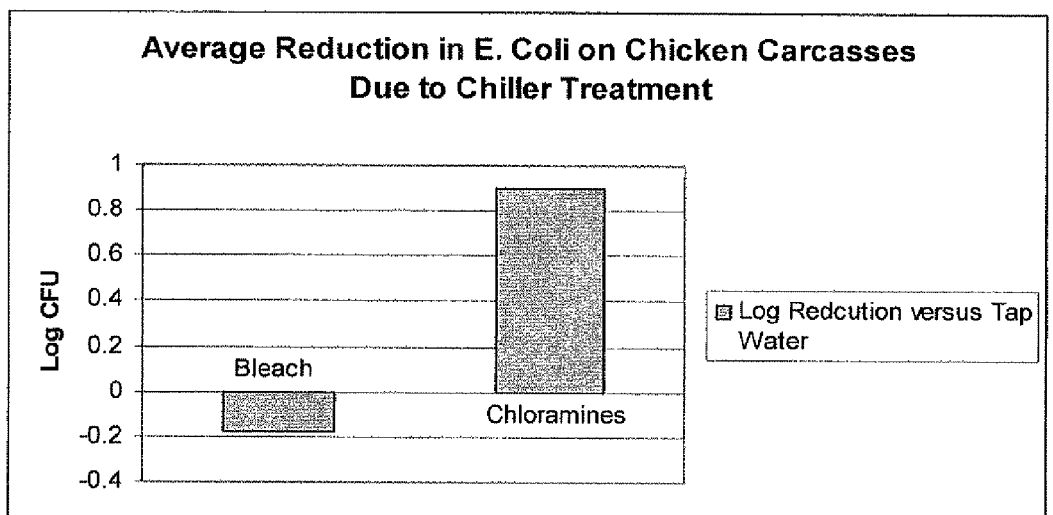
Figure 8:
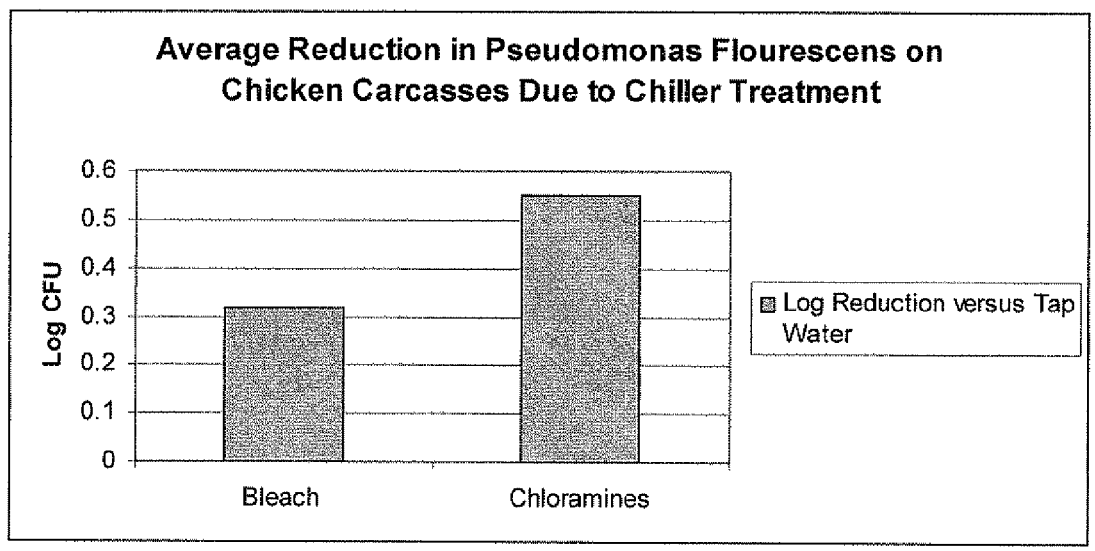

As shown in the FIG. 6 FIG. 7 and FIG. 8, the inventive process demonstrated superior performance in the reduction of both *Salmonella* and *E. coli* versus chlorine bleach. These two pathogens are of paramount concern to poultry processors.

The inventive process also demonstrated superior performance against sodium hypochlorite (bleach) in the reduction of the spoilage bacteria *Pseudomonas fluorescens*. The ability to reduce these bacteria offers the potential to extend the shelf life of poultry carcasses, which would have major economic benefits to poultry processors.

Although the foregoing illustrative embodiments disclose the use of chloramines in the disinfection of poultry processing aqueous medium, it should be appreciated by those skilled in the art that chloramines can be used as disinfectants within the beef industry in the processing of carcasses, parts and trim. Likewise it should also be appreciated that the use of chloramines within the chilled water spray systems in beef processing plants would provide added anti-microbial benefit. Additionally, it should further be appreciated that the use of chloramines within wash water used to clean equipment within the beef processing industry would provide consistent pathogen reduction on beef processing equipment.

Although the foregoing illustrative embodiments disclose the use of chloramines in the disinfection of poultry processing aqueous medium, it should be appreciated by those skilled in the art that chloramines can be used as disinfectants within the pork industry in the processing of carcasses. Likewise it should also be appreciated that the use of chloramines within the chilled water spray systems in pork processing plants would provide added anti-microbial benefit. Additionally, it should further be appreciated that the use of chloramines within wash water used to clean equipment within the pork processing industry would provide consistent pathogen reduction on pork processing equipment.

Although the foregoing illustrative embodiments disclose the use of chloramines in the disinfection of poultry processing aqueous medium, it should be appreciated by those skilled in the art that chloramines can be used as disinfectants within the seafood industry in the processing of fish. Likewise it should also be appreciated that the use of chloramines within the chilled water spray systems in fish processing plants would provide added anti-microbial benefit. Additionally, it should further be appreciated that the use of chloramines within wash water used to clean equipment within the fish processing industry would provide consistent pathogen reduction on fish processing equipment.

Although the foregoing illustrative embodiments disclose the use of chloramines in the disinfection of poultry processing aqueous medium, it should be appreciated by those skilled in the art that chloramines can be used as disinfectants within the produce industry in the processing of fresh cut vegetables. Likewise it should also be appreciated that the use of chloramines within the flume water systems in vegetable processing plants would provide added anti-microbial benefit. Specifically, lesions upon the skin of such products such as potatoes are an opportunity for bacterial soft rot to enter the potato. It will be appreciated that chloramines may be useful to control cross contamination of soft rot in the processing flumes. Additionally, it should further be appreciated that the use of chloramines within wash water used to clean equipment within the produce processing industry would provide consistent pathogen reduction thereby avoiding cross contamination of produce on processing equipment.

Although the foregoing illustrative embodiments disclose the use of chloramines in the disinfection of poultry processing aqueous medium, it should be appreciated by those skilled in the art that chloramines can be used as disinfectants within the produce industry in the processing of fresh cut vegetables. Likewise it should also be appreciated that the use of chloramines within the water systems in indoor sprout growing facilities would provide added anti-microbial benefit. Specifically, Alfalfa sprouts and Mung beans are flooded quite frequently as they are grown over a short period of time.

Both products are susceptible to bacterial rot as well as pathogens. It will be appreciated that chloramines may be useful to control bacterial rot and pathogens in the growing of these products.

Although the foregoing illustrative embodiments disclose the use of chloramines in the disinfection of poultry processing aqueous medium, it should be appreciated by those skilled in the art that chloramines can be used as disinfectants within the cooked package products industry in the disinfection of processing operations including retort cookers and pasteurizers.

Although the foregoing illustrative embodiments disclose the use of chloramines such as monochloramine and dichloramine in the disinfection of poultry processing aqueous medium, it should be appreciated by those skilled in the art that other reacted chloramine type compounds that are not highly reactive in nature can be used as disinfectants.

Although the foregoing illustrative embodiments disclose the use of chloramines in the disinfection of poultry processing aqueous medium, it should be appreciated by those skilled in the art that chloraminated water can be used to make ice utilized for food processing and storage. Such chloraminated ice will provide an antimicrobial effect, either for pathogen control or food preservation, when food products come in contact with either the ice or the water after the ice melts.

The foregoing has been a description of certain specific embodiments of the present disclosure. The present disclosure is not to be limited in scope by the illustrative embodiments described which are intended as specific illustrations of individual aspects of the disclosure, and functionally equivalent methods and components are within the scope of the invention. Indeed, various modifications of the disclosure, in addition to those shown and described herein will become apparent to those skilled in the art from the foregoing description and all such modifications are included.

What is claimed is:

1. A method for reducing the level of bacterial poultry contamination resulting from the processing of poultry, wherein the processing of poultry includes the processing steps of scalding, picking, eviscerating, washing, rinsing and chilling said poultry, the method for reducing the level of bacterial poultry contamination comprising the steps of: adding chloramines as a disinfectant to an aqueous medium used in at least one processing steps forming a disinfected aqueous medium, said chloramines comprising monochloramine; and using said disinfected process water in at least one of said processing steps, thereby reducing the level of bacterial contamination of the poultry at each of said processing steps.

2. The method according to claim 1 wherein said chloramines are comprised of a combination of monochloramine and dichloramine.

3. The method according to claim 1 wherein said chloramines are comprised of a combination of monochloramine and dichloramine in a ratio of about 1:0 to about 1:1.

4. The method according to claim 3 wherein said chloramines are introduced into said aqueous medium where said aqueous medium has a desired pH range to control said ratio of monochloramine to dichloramine.

5. The method according to claim 1 wherein said chloramines are present within said aqueous medium in nominally equimolar concentrations of monochloramine, dichloramine and free chlorine.

6. The method according to claim 1 wherein said disinfected aqueous medium contains residual mono chloramine.

7. The method according to claim 1 wherein disinfection of the aqueous medium is to accomplish pathogen control.

8. The method according to claim 1 where in disinfection of the aqueous medium is to accomplish preservation of the useful life of the poultry.

9. A method for processing poultry using a process for disinfecting a recyclable aqueous medium including bacterial contamination, said process for disinfecting comprising the steps of: recovering at least a portion of the aqueous medium from a processing step; filtering said recovered aqueous medium to remove particulate matter; disinfecting said aqueous medium with ozone; introducing chloramines to said aqueous medium, said chloramines comprising monochloroamine; and reusing said recovered, filtered, disinfected and chloraminated aqueous medium in a poultry processing step.

10. The method according to claim 9 further comprising a step of controlling the pH level of said disinfected aqueous medium.

11. The method according to claim 9 wherein said chloramines are comprised of a combination of monochloramine and dichloramine.

12. The method according to claim 9 wherein said chloramines are comprised of a combination of monochloramine and dichloramine in a ratio of about 1:0 to about 1:1.

13. The method according to claim 12 wherein said chloramines are introduced into said aqueous medium where said aqueous medium has a desired pH range to control said ratio of monochloramine to dichloramine.

14. The method according to claim 9 wherein said chloramines are present within said aqueous medium in nominally equimolar concentrations of monochloramine, dichloramine and free chlorine.

15. The method according to claim 9 wherein said disinfected aqueous medium contains residual monochloramine.

16. The method according to claim 9 wherein said disinfected aqueous medium is used to accomplish pathogen control.

17. The method according to claim 9 wherein said disinfected aqueous medium is used to accomplish preservation of the useful life of the poultry.

18. A method for reducing the level of bacterial poultry contamination resulting from the processing of poultry, wherein the processing of said poultry includes the steps of scalder, picker, post-pick, washer, rinsing and chilling, the method comprising the steps of: recovering water used during at least one of said poultry processing steps; treating said recovered water with chloramines, said chloramines comprising monochloroamine and controlling the pH of said recovered water to reduce bacteria therein; and reintroducing said treated recovered water into at least one processing step which uses heated water, whereby the combination of said treated water and said heated water reduces the level of bacteria within said poultry.

19. The method according to claim 18 wherein said chloramines are comprised of a combination of monochloramine and dichloramine.

20. The method according to claim 18 wherein said chloramines are comprised of a combination of monochloramine and dichloramine in a ratio of about 1:0 to about 1:1.

21. The method according to claim 20 wherein said chloramines are introduced into said recovered water where said recovered water has a desired pH range to control said ratio of monochloramine to dichloramine.

22. The method according to claim 18 wherein said chloramines are present within said recovered water in nominally equimolar concentrations of monochloramine, dichloramine and free chlorine.

23. The method according to claim 18 wherein said treated recovered water contains residual monochloramine.

24. The method according to claim 18 wherein a primary disinfection step of the recovered process water is accomplished by the use of ozone before the introduction of chloramines.

25. The method according to claim 18 wherein chloramines are introduced for pathogen control.

26. The method according to claim 18 wherein chloramines are introduced for food preservation.

27. A process for reducing the level of bacterial poultry contamination resulting from poultry processing including the steps of scalder, picker, post-pick, washer, rinsing and chilling, the process including a water reuse and disinfection method, the water reuse method comprising the steps of: recovering water used during at least one of said poultry processing steps; treating said recovered water with chloramines to reduce the level of microorganisms therein, said chloramines comprising monochloramine; and reintroducing said treated water into at least one of said poultry processing steps which uses heated water; the disinfection method comprising steps of: adding a chloramines to water used in said poultry processing steps forming a disinfected water, said chloramines comprising monochloramine; and using said disinfected water in at least one of said poultry processing steps which uses heated water, whereby the combination of said reuse water, said heated water and said disinfected water in said poultry processing steps reduces the level of bacterial contamination within said poultry.

28. A method for food processing comprising the use of an aqueous medium said food processing using a process for disinfecting said aqueous medium and food stuffs, said process for disinfecting comprising the steps of: recovering at least a portion of an aqueous medium including bacterial contamination from a processing step; filtering said recovered aqueous medium to remove particulate matter; treating said aqueous medium by introduction of chloramines within said aqueous medium to disinfect said aqueous medium, said chloramines comprising monochloramine; and reusing the disinfected, filtered, and recovered aqueous medium in a processing step.

29. The method according to claim 28 wherein a primary disinfection step of the recovered process water is accomplished by use of ozone before the introduction of chloramines.

30. A method for pathogen reduction in including bacterial contamination food stuffs within food product processing comprising the steps of: providing an aqueous medium that comes in contact with food stuffs within said food product processing treating said aqueous medium by the introduction of chloramines, said chloramines reducing pathogens including bacteria contamination within foodstuffs within said food product processing, said chloramines comprising monochloramine.

31. The method according to claim 30 wherein said chloramines are comprised of a combination of monochloramine and dichloramine.

32. The method according to claim 31 wherein said combination of monochloramine and dichloramine is in a ratio of about 1:0 to about 1:1.

33. The method according to claim 32 wherein said aqueous medium has selected pH range to control said ratio of monochloramine to dichloramine.

34. The method according to claim 30 wherein said chloramines are present within said aqueous medium in nominally equimolar concentrations of monochloramines, dichloramine and free chlorine.

35. The method according to claim 30 wherein said aqueous medium contains residual monochloramines.

36. The method according to claim 30 wherein disinfection of the aqueous medium and food stuffs increases preservation of food products.

37. A method for reducing the level of bacterial poultry contamination resulting from the scalder processing step or any other processing step which uses heated water, the method comprising the treatment of the heated water in the scalder or other heated processing step or make-up water that will enter the heated processing water with chloramines to reduce the level of bacteria therein, said chloramines comprising monochloramine.

* * * * *